US007353382B2

(12) United States Patent
Labrou et al.

(10) Patent No.: US 7,353,382 B2
(45) Date of Patent: Apr. 1, 2008

(54) SECURITY FRAMEWORK AND PROTOCOL FOR UNIVERSAL PERVASIVE TRANSACTIONS

(75) Inventors: Yannis Labrou, Baltimore, MD (US); Lusheng Ji, Silver Spring, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 821 days.

(21) Appl. No.: 10/458,205

(22) Filed: Jun. 11, 2003

(65) Prior Publication Data

US 2004/0030894 A1 Feb. 12, 2004

Related U.S. Application Data

(60) Provisional application No. 60/401,807, filed on Aug. 8, 2002.

(51) Int. Cl.
*H04L 9/00* (2006.01)
*H04L 9/14* (2006.01)
*H04K 1/00* (2006.01)

(52) U.S. Cl. .................. 713/155; 705/78; 380/277
(58) Field of Classification Search ................ 713/155; 705/78; 380/277
See application file for complete search history.

(56) References Cited

U.S. PATENT DOCUMENTS

| 4,182,261 | A |   | 1/1980  | Smith, III et al.    |         |
|-----------|---|---|---------|----------------------|---------|
| 4,253,086 | A |   | 2/1981  | Szwarcbier           |         |
| 4,582,985 | A |   | 4/1986  | Lofberg              |         |
| 4,636,622 | A |   | 1/1987  | Clark                |         |
| 4,882,195 | A |   | 11/1989 | Butland              |         |
| 5,095,194 | A |   | 3/1992  | Barbanell            |         |
| 5,194,289 | A |   | 3/1993  | Butland              |         |
| 5,239,166 | A |   | 8/1993  | Graves               |         |
| 5,256,863 | A |   | 10/1993 | Ferguson et al. .............. | 705/21  |
| 5,363,453 | A |   | 11/1994 | Gagne et al.         |         |
| 5,465,328 | A |   | 11/1995 | Dievendorff et al. ......... | 714/15  |
| 5,485,312 | A |   | 1/1996  | Horner et al.        |         |
| 5,598,474 | A |   | 1/1997  | Johnson              |         |
| 5,631,961 | A | * | 5/1997  | Mills et al. .................. | 380/286 |

(Continued)

FOREIGN PATENT DOCUMENTS

DE        103 10 527 A1        9/2004

(Continued)

OTHER PUBLICATIONS

Deborah Bach, "CIBC Makes Long-Term Case for Wireless" [online], American Banker, vol. 167, No. 65, Apr. 5, 2002 (2 pages) [retrieved on Aug. 2, 2002]. Retrieved from the Internet: <URL: http://www.nerac.com>.

(Continued)

*Primary Examiner*—Emmanuel L. Moise
*Assistant Examiner*—Michael Pyzocha
(74) *Attorney, Agent, or Firm*—Staas & Halsey LLP

(57) ABSTRACT

A computer system, a method of a computer system and a computer-readable medium securely transmit and verify a multiparty agreement. The method, the computer system, and the computer readable medium include developing and transmitting views of the multi-party agreement by each party to a separate verification party. The verification party authenticates the participants and determines whether the views of the agreement are mutually consistent, and notifies the partys of the results of the comparison.

32 Claims, 8 Drawing Sheets

U.S. PATENT DOCUMENTS

| | | | |
|---|---|---|---|
| 5,644,118 A | | 7/1997 | Hayashida |
| 5,666,420 A | * | 9/1997 | Micali .......... 380/30 |
| 5,732,148 A | | 3/1998 | Keagy et al. |
| 5,790,677 A | * | 8/1998 | Fox et al. ............ 705/78 |
| 5,869,822 A | | 2/1999 | Meadows, II et al. |
| 5,917,168 A | | 6/1999 | Nakamura et al. |
| 5,949,043 A | | 9/1999 | Hayashida |
| 6,003,762 A | | 12/1999 | Hayashida |
| 6,003,767 A | | 12/1999 | Hayashida |
| 6,006,328 A | | 12/1999 | Drake |
| 6,010,068 A | | 1/2000 | Bozzo |
| 6,044,388 A | * | 3/2000 | DeBellis et al. .......... 708/254 |
| 6,067,621 A | * | 5/2000 | Yu et al. ............ 713/172 |
| 6,069,969 A | | 5/2000 | Keagy et al. |
| 6,098,053 A | | 8/2000 | Slater |
| 6,115,601 A | | 9/2000 | Ferreira |
| 6,137,884 A | * | 10/2000 | Micali .......... 380/30 |
| 6,175,922 B1 | | 1/2001 | Wang |
| 6,175,923 B1 | | 1/2001 | Bailey |
| 6,182,892 B1 | | 2/2001 | Angelo et al. |
| 6,199,099 B1 | | 3/2001 | Gershman et al. .......... 709/203 |
| 6,212,290 B1 | | 4/2001 | Gagne et al. |
| 6,226,752 B1 | | 5/2001 | Gupta et al. |
| 6,257,487 B1 | | 7/2001 | Hayashida |
| 6,263,436 B1 | * | 7/2001 | Franklin et al. .......... 713/167 |
| 6,270,011 B1 | | 8/2001 | Gottfried |
| 6,334,575 B1 | | 1/2002 | Su-Hui |
| 6,356,752 B1 | | 3/2002 | Griffith |
| 6,366,893 B2 | | 4/2002 | Hannula et al. |
| 6,377,692 B1 | | 4/2002 | Takahashi et al. |
| 6,378,073 B1 | | 4/2002 | Davis |
| 6,378,775 B2 | | 4/2002 | Hayashida |
| 6,405,314 B1 | | 6/2002 | Bailey |
| 6,435,406 B1 | | 8/2002 | Pentel ............ 235/380 |
| 6,470,448 B1 | * | 10/2002 | Kuroda et al. .......... 713/176 |
| 6,512,919 B2 | | 1/2003 | Ogasawara |
| 6,529,885 B1 | | 3/2003 | Johnson ............ 705/64 |
| 6,687,375 B1 | * | 2/2004 | Matyas et al. .......... 380/45 |
| 6,715,679 B1 | | 4/2004 | Infosino |
| 6,766,453 B1 | * | 7/2004 | Nessett et al. .......... 713/171 |
| 6,775,777 B2 | | 8/2004 | Bailey |
| 6,817,521 B1 | | 11/2004 | Matada |
| 6,915,951 B2 | | 7/2005 | Hayashida |
| 6,926,200 B1 | | 8/2005 | Hayashida |
| 6,931,431 B2 | * | 8/2005 | Cachin et al. .......... 709/205 |
| 6,957,334 B1 | * | 10/2005 | Goldstein et al. .......... 713/170 |
| 7,003,499 B2 | | 2/2006 | Arditti et al. |
| 7,167,844 B1 | | 1/2007 | Leong et al. |
| 7,239,346 B1 | | 7/2007 | Priddy ............ 348/220.1 |
| 2001/0004231 A1 | | 6/2001 | Bailey |
| 2001/0005840 A1 | | 6/2001 | Espoo |
| 2001/0010723 A1 | * | 8/2001 | Pinkas ............ 380/286 |
| 2001/0034670 A1 | | 10/2001 | Blair ............ 705/27 |
| 2001/0037264 A1 | | 11/2001 | Husemann et al. .......... 705/26 |
| 2001/0045458 A1 | | 11/2001 | Polansky |
| 2001/0053239 A1 | | 12/2001 | Takhar |
| 2002/0017561 A1 | | 2/2002 | Hiroyuki |
| 2002/0018585 A1 | | 2/2002 | Kim |
| 2002/0073024 A1 | | 6/2002 | Gilchrist |
| 2002/0077974 A1 | | 6/2002 | Ortiz |
| 2002/0077993 A1 | | 6/2002 | Immonen et al. |
| 2002/0082925 A1 | | 6/2002 | Herwig |
| 2002/0087534 A1 | * | 7/2002 | Blackman et al. ............ 707/4 |
| 2002/0087869 A1 | | 7/2002 | Kim |
| 2002/0095296 A1 | | 7/2002 | Hind et al. |
| 2002/0097867 A1 | * | 7/2002 | Bartram ............ 380/37 |
| 2002/0107007 A1 | | 8/2002 | Gerson |
| 2002/0107791 A1 | | 8/2002 | Nobrega |
| 2002/0163421 A1 | | 11/2002 | Wang et al. |
| 2002/0176579 A1 | | 11/2002 | Deshpande et al. .......... 380/270 |
| 2002/0196944 A1 | | 12/2002 | Davis et al. |
| 2003/0061486 A1 | | 3/2003 | Shibuya et al. |
| 2003/0123667 A1 | * | 7/2003 | Weber et al. ............ 380/277 |
| 2003/0174049 A1 | | 9/2003 | Beigel et al. |
| 2004/0104268 A1 | | 6/2004 | Bailey |
| 2004/0234117 A1 | | 11/2004 | Tibor |
| 2005/0122209 A1 | | 6/2005 | Black |
| 2005/0194452 A1 | | 9/2005 | Nordentoft et al. |
| 2006/0229988 A1 | | 10/2006 | Oshima et al. |
| 2006/0266823 A1 | | 11/2006 | Passen et al. |

FOREIGN PATENT DOCUMENTS

| | | |
|---|---|---|
| EP | 0950968 | 2/1999 |
| EP | 1 120 761 A2 | 8/2001 |
| EP | 1 178 444 A1 | 2/2002 |
| EP | 1 231 578 A2 | 8/2002 |
| EP | 1 237 132 A2 | 9/2002 |
| EP | 1 237 133 A2 | 9/2002 |
| EP | 1 237 134 A2 | 9/2002 |
| EP | 1 388 797 A2 | 2/2004 |
| GB | 2 386 236 | 9/2003 |
| JP | 2000-207483 | 7/2000 |
| JP | 2000-269957 | 9/2000 |
| JP | 2002-259621 | 9/2002 |
| KR | 2000-0068758 | 11/2000 |
| WO | WO 97-41932 | 11/1997 |
| WO | WO 97-45814 | 12/1997 |
| WO | WO 98/25371 | 6/1998 |
| WO | WO 98/37524 | 8/1998 |
| WO | WO 00/46959 | 8/2000 |
| WO | WO 01/01361 | 1/2001 |
| WO | WO 01-35570 | 5/2001 |
| WO | WO 01/35570 A1 | 5/2001 |
| WO | WO 01/80133 | 10/2001 |
| WO | WO 01/98854 | 12/2001 |
| WO | WO 02/07117 | 1/2002 |
| WO | WO 02/11082 | 2/2002 |
| WO | WO 02/13151 | 2/2002 |
| WO | WO 02/27421 | 4/2002 |
| WO | WO 02/27439 | 4/2002 |
| WO | WO 02/29708 | 4/2002 |
| WO | WO 02/29739 | 4/2002 |
| WO | WO02/41271 | 5/2002 |
| WO | WO 02/43020 | 5/2002 |
| WO | WO 02/054655 | 7/2002 |
| WO | WO 02-059849 | 8/2002 |
| WO | WO 02/067534 | 8/2002 |

OTHER PUBLICATIONS

"WAWA Installs Wireless Card Processing." [online], CardLine, 2001 (1 page) [retrieved on Aug. 2, 2002]. Retrieved from the Internet: <URL: http://www.nerac.com>.

Jennifer A. Kingson, "First Data Sets Strategy for Wireless" [online], American Banker, vol. 167, No. 17, Jan. 25, 2002 (3 pages) [retrieved on Aug. 2, 2002]. Retrieved from the Internet: <URL: http://www.nerac.com>.

"Thirsty? Soon you may be able to charge and chug" [online], USA Today, Dec. 21, 2001, p. 7B (1 page) [retrieved on Aug. 2, 2002]. Retrieved from the Internet: <URL: http://www.nerac.com>.

M. Giometti, et al., "Creating Winning M-Commerce Models in the Financial Services" [online], FutureBanker, vol. 5, No. 10, Dec. 2001, p. 37 (2 pages) [retrieved on Aug. 2, 2002]. Retrieved from the Internet: <URL: http://www.nerac.com>.

"Hongkong Post Launches Mobile e-Certs" [online], Online Reporter, Oct. 22, 2001 (2 page) [retrieved on Aug. 2, 2002]. Retrieved from the Internet: <URL: http://www.nerac.com>.

"Wallet and WIM pilot" [online], Mobile Europe, Oct. 2001, p. 16 (1 page) [retrieved on Aug. 2, 2002]. Retrieved from the Internet: <URL: http://www.nerac.com>.

"Regional News: Asia/Pacific: DoCoMo, Sony Use E-Purse, PDAs In Mobile Commerce Trial" [online]. Card Technology, vol. 2, No. 10, Oct. 2001 (1 page) [retrieved on Aug. 2, 2002]. Retrieved from the Internet: <URL: http://www.nerac.com>.

"Wildcard Sure Mobile Pizza Pilot Will Deliver" [online]. CardLine, Oct. 2001 (1 page) [retrieved on Aug. 2, 2002]. Retrieved from the Internet: <URL: http://www.nerac.com>.

Varshney, Upkar, et al., "Mobile commerce: Framework, applications and networking support" [online]. Mobile Networks Appl., vol. 7, No. 3, Jun. 2002, pp. 185-198 (1 page) [retrieved on Aug. 2, 2002]. Retrieved from the Internet: <URL: http://www.nerac.com>.

Friis-Hansen, et al., "Secure electronic transactions—The mobile phone evolution continues" [online]. Ericsson Rev. (Engl. Ed); vol. 78, No. 4, 2001, pp. 162-167 (1 page) [retrieved on Aug. 2, 2002]. Retrieved from the Internet: <URL: http://www.nerac.com>.

Bettstetter, Christian, et al., "(Auto) mobile communication in a heterogeneous and converged world" [online]. IEEE Pers Commun., vol. 8, No. 6, Dec. 2001, pp. 41-47 (1 page) [retrieved on Aug. 2, 2002]. Retrieved from the Internet: <URL: http://www.nerac.com>.

Gupta, S., "Securing the wireless internet" [online]. IEEE Commun. Mag., vol. 39, No. 12, Dec. 2001, pp. 68-71 (1 page) [retrieved on Aug. 2, 2002]. Retrieved from the Internet: <URL: http://www.nerac.com>.

Aalders, K., "Travel card: Airport self-check in using a wireless PDA" [online]. IEEE Conf. Intell Transport Syst Proc ITSC, 2001, pp. 1224-1228 (1 page) [retrieved on Aug. 2, 2002]. Retrieved from the Internet: <URL: http://www.nerac.com>.

Brananaghan, R.J., "Human factors issues in the design of handheld wireless devices" [online]. Proc SPIE Int Soc Opt Eng, vol. 4428, 2001, pp. 37-41 (1 page) [retrieved on Aug. 2, 2002]. Retrieved from the Internet: <URL: http://www.nerac.com>.

Cohn, Michael, Like money in your hand: Wireless technology lets financial firms quickly deliver transactions and trades. (Financial Services) [online]. Internet World, vol. 8, No. 5, May 1, 2002, pp. 54(3) (4 pages). [retrieved on Aug. 2, 2002]. Retrieved from the Internet: <URL: http://www.nerac.com>.

Ray Cammack Shows. (M&S News). (to use wireless credit card terminals) (Brief Article) [online]. Amusement Business, vol. 114, No. 17, Apr. 29, 2002, pp. 4(1) (1 page) [retrieved on Aug. 2, 2002]. Retrieved from the Internet: <URL: http://www.nerac.com>.

Kabaher, April, MasterCard snags citi exec for new wireless role. (Brief Article) [online]. Financial Net News, vol. 7, No. 14, Apr. 8, 2002, pp. 1(2) (1 page) [retrieved on Aug. 2, 2002]. Retrieved from the Internet: <URL: http://www.nerac.com>.

"Pepsi North America tests wireless vending in Memphis" [online]. Automatic Merchandiser, vol. 44, No. 2, Feb. 1, 2002, pp. 9(1) (1 page) [retrieved on Aug. 2, 2002]. Retrieved from the Internet: <URL: http://www.nerac.com>.

Radding, Alan, "Crossing the Wireless Security Gap." [online]. Computerworld, Jan. 1, 2001 (3 pages) [retrieved on Aug. 2, 2002]. Retrieved from the Internet: <URL: http://www.nerac.com>.

Commerciant inks wireless deal. (EDS will provide transaction processing services for Commerciant's wireless terminals) (Brief Article) [online]. Houston Business Journal, vol. 32, No. 23, Oct. 19, 2001 (1 page) [retrieved on Aug. 2, 2002]. Retrieved from the Internet: <URL: http://www.nerac.com>.

"Wireless in Boston (Fleet HomeLink offers services through personal digital assistants) (Brief Article)" [online]. Bank Marketing, vol. 33, No. 7, Sep. 1, 2001 (1 page) [retrieved on Aug. 2, 2002]. Retrieved from the Internet: <URL: http://www.nerac.com>.

Murphy, Patricia A., Wireless payment technology spreads from gas pump to store. (VeriFone system) [online]. Stores, vol. 83, No. 5, May 1, 2001, pp. 74(2) (1 page) [retrieved on Aug. 2, 2002]. Retrieved from the Internet: <URL: http://www.nerac.com>.

Hoffman, Karen Epper, New Options in Wireless Payments. (Company Business and Marketing) [online]. Internet World, vol. 7, No. 7, Apr. 1, 2001, pp. 37 (4 pages) [retrieved on Aug. 2, 2002]. Retrieved from the Internet: <URL: http://www.nerac.com>.

Khachtchanski, V.I., et al., "Universal SIM toolkit-based client for mobile authorization system" [online]. Third International Conference on Information Integration and Web-based Applications and Services, 2001, pp. 337-344 (1 page) [retrieved on Aug. 2, 2002]. Retrieved from the Internet: <URL: http://www.nerac.com>.

"CIBC kicks off wireless banking service" [online]. Bank Systems + Technology, vol. 39, No. 5, May 2002, p. 12 (1 page) [retrieved on Aug. 2, 2002]. Retrieved from the Internet: <URL: http://www.nerac.com>.

Asthana, Abhaya, et al., An Indoor Wireless System for Personalized Shopping Assistance (1994) [online]. IEEE Workshop on Mobile Computing Systems and Applications (1 page) [retrieved on Aug. 2, 2002]. Retrieved from the Internet: <URL: http://www.nerac.com>.

Electronic payment systems, involving mobile phones (list of e-products, 15 listings), [online] Electronic Payment System Observatory (the ePSO website aims to monitor the progress of retail payment innovation throughout Europe, ePSO inventory of E-Payment services—List of e-products) (26 pages). European Central Bank, Frankfurt, Germany, 2002 [retrieved Sep. 11, 2002]. Retrieved from the Internet: <http://epso.intrasoft.lu>.

Yannis Labrou, et al., "Wireless Wallet", Proceedings of the First Annual International Conference on Mobile and Ubiquitous Systems: Networking and Services (MobiQuitous '04); ISBN 0-7695-2208-4, IEEE, Aug. 22, 2004.

U.S. Appl. No. 60/401,807, filed Aug. 8, 2002, Yannis Labrou et al., Fujitsu Limited Kawasaki, Japan.

U.S. Appl. No. 10/628,584, filed Jul. 29, 2003, Yannis Labrou et al., Fujitsu Limited Kawasaki, Japan.

U.S. Appl. No. 10/628,569, filed Jul. 29, 2003, Yannis Labrou et al., Fujitsu Limited Kawasaki, Japan.

U.S. Appl. No. 10/628,583, filed Jul. 29, 2003, Yannis Labrou et al., Fujitsu Limited Kawasaki, Japan.

U.S. Appl. No. 60/544,300, filed Feb. 17, 2004, Yannis Labrou et al., Fujitsu Limited Kawasaki, Japan.

U.S. Appl. No. 60/669,375, filed Apr. 8, 2005, Yannis Labrou et al., Fujitsu Limited Kawasaki, Japan.

U.S. Appl. No. 11/045,484, filed Jan. 31, 2005, Yannis Labrou et al., Fujitsu Limited Kawasaki, Japan.

U.S. Appl. No. 60/703,862, filed Aug. 1, 2005, Yannis Labrou et al., Fujitsu Limited Kawasaki, Japan.

U.S. Appl. No. 11/041,223, filed Jan. 25, 2005, Yannis Labrou et al., Fujitsu Limited Kawasaki, Japan.

U.S. Appl. No. 11/388,202, filed Mar. 24, 2006, Yannis Labrou et al., Fujitsu Limited Kawasaki, Japan.

U.S. Appl. No. 11/488,178, filed Jul. 18, 2006, Yannis Labrou et al., Fujitsu Limited Kawasaki, Japan.

U.S. Appl. No. 60/541,903, filed Feb. 6, 2004, Yannis Labrou et al., Fujitsu Limited Kawasaki, Japan.

U.S. Appl. No. 60/549,148, filed Mar. 3, 2004, Yannis Labrou et al., Fujitsu Limited Kawasaki, Japan.

U.S. Appl. No. 60/575,835, filed Jun. 2, 2004, Yannis Labrou et al., Fujitsu Limited Kawasaki, Japan.

PCT International Search Report dated Oct. 4, 2005 for International Application No. PCT/US05/04049 related to the above-identified present pending US patent application (3 pages).

Form PCT/ISA/237—Written Opinion of the International Searching Authority dated Oct. 4, 2005 in International Application No. PCT/US05/04049 related to the above-identified present pending US patent application (3 pages).

International Preliminary Report on Patentability (Chapter I of the Patent Cooperation Treaty) dated Aug. 22, 2006 in International Application No. PCT/US05/04049 related to the above-identified present pending US patent application (5 pages).

European Communication Pursuant to Article 96(2) EPC dated Jul. 26, 2005 in European Application No. 03 254 927.1-1238, related to the above-identified present pending US patent application (6 pages).

European Search Report Communication issued by the European Patent Office on Aug. 30, 2004 in European Application No. 03254927.1-1238 related to the above-identified present pending US patent application (3 pages).

European Search Report Communication issued by the European Patent Office on Jan. 8, 2007 in Application No. 06253923.4-1238 related to the above-identified present pending US patent application (13 pages).

Nerac (Patents, Intellectual Property, Research), [online]. Nerac, Inc. Tolland CT, USA, 4 pages [retrieved Dec. 18, 2006]. Retrieved from the Internet: <URL: http://www.nerac.com>.

MeT Mobile electronic Transactions (MeT limited is a company founded to establish a framework for secure mobile transactions) [online]. Mobile electronic Transactions Limited, 2003, 3 pages [retrieved Jan. 5, 2005]. Retrieved from the Internet: <URL: http://www.mobiletransaction.org>.

Two-Factor Token Matrix [online]. Diversinet Corp., 2 pages [retrieved on Mar. 24, 2006]. Retrieved from the Internet: <URL: http://www.diversinet.com/>.

Diversinet Delivers Consumer-Ready Soft Token Strong Authentication Solution [online]. Diversinet Corp., Feb. 7, 2006, 2 pages [retrieved on Dec. 27, 2006]. Retrieved from the Internet: <URL: http://www.diversinet.com/html/press/2006/consumer.html>.

Labrou, Yannis, 'Re: Mobile payments with a downloadable application from PayWi (referencing "PayWi Powers Personal Payments in Your Palm," PRNewswire, Portland Oregon, Feb. 6, 2006) [online]. Feb. 21, 2006 (4 pages) [retrieved Mar. 24, 2006]. Retrieved from the Internet: <URL: http://uptf.blogspot.com/2006/02/mobile-payments-with-downloadable.html>.

Labrou, Yannis. UPTF blog (a blog for Wireless Wallet) [online] 22 pages [retrieved Dec. 27, 2006] Retrieved from the Internet: <URL: http://uptf.blogspot.com>.

Electronic Payment System Observatory (the ePSO website aims to monitor the progress of retail payment innovation throughout Europe, ePSO inventory of E-Payment services—List of e-products) [online]. European Central Bank, Frankfurt, Germany (3 pages) [retrieved Dec. 18, 2006]. Retrieved from the Internet: <URL: http://epso.intrasoft.lu>.

"Via Licensing Begins Process to Form Wireless Networking Patent Licensing Pool" [online]. Via Licensing Corporation, Oct. 23, 2003, 3 pages [retrieved Nov. 17, 2003]. Retrieved from the Internet: <URL: http://www.vialicensing.com/news/details.cfm?VIANEWS_ID=308>.

Labrou, Yannis, 'Re: Motorola's M-Wallet: Mobile payments with a J2ME application' (referencing "Motorola M-Wallet Solution" brochure Motorola, Inc. 2006) In UPTF blog for Wireless Wallet [online], Feb. 21, 2006, 5 pages [retrieved Mar. 24, 2006]. Retrieved from the Internet: <URL: http://uptf.blogspot.com/2006/02/mobile-payment-with-downloadable.html>.

IEEE Standards Association (IEEE Std 802.11 and amendments) (802.11 patent information) [online]. IEEE-SA, 19 pages [retrieved Dec. 27, 2006]. Retrieved from the Internet: <URL: http://standards.ieee.org/db/patents/pat802_11.html>.

Mobile, Academic Press Dictionary of Science and Technology, xreferplus (1992); <URL: http://xreferplus.com/entry.jsp?xrefid=3130947&secid=.&hh=1>, 1 page.

Purchase, 1996, Merriam-Webster's Dictionary of Law, <URL: http://dictionary.reference.com/browse/purchase>, pp. 2-5 of 8 (4 pages).

Asthana, Abhaya, et al., An Indoor Wireless System for Personalized Shopping Assistance (1994) [online]. IEEE Workshop on Mobile Computing Systems and Applications (1 page Abstract) [retrieved on Aug. 2, 2002]. Retrieved from the Internet: <URL: http://www.nerac.com>.

PCT International Search Report dated Oct. 4, 2005 for International Application No. PCT/US05/04049 related to the above-identified present pending US patent application (2 pages).

European Search Report Communication issued by the European Patent Office on Apr. 23, 2007 in Application No. 06251957.4-1244 related to the above-identified present pending US patent application (9 pages).

European Search Report Communication issued by the European Patent Office on Nov. 15, 2007 in the corresponding European Patent Application No. 03254926.3-1244 (3 pages).

Korean Office Action issued by the Korean Intellectual Property Office on Nov. 8, 2007 in related Korean Patent Application No. 10-2006-7019071 based upon PCT/US2005/004049 (4 pages) (English translation consisting of 4 pages).

Alfred J. Menezes, et al., "Handbook of Applied Cryptography", 1997 CRC Press LLC, Section 1.5 Symmetric-key encryption, (9 pages).

* cited by examiner

800

Token 801 | TID | DID₁ | TS₁ | DUID₁ | TKID | DID₂ | TokenCode | Data |
802 804 806 808 810 812 814

Token Receipt 821 | TID | DID₂ | TS₂ | DUID₂ | TKID | TSᵥ | DID₁ | TokenCode | Data |
822 824 826 828 829 830 832 834

SECURITY FRAMEWORK AND PROTOCOL FOR UNIVERSAL PERVASIVE TRANSACTIONS

CROSS-REFERENCE TO RELATED APPLICATIONS

This application is related to, and claims the benefit of priority to, Provisional Application U.S. Ser. No. 60/401,807, entitled METHODS AND APPARATUSES FOR SECURE MULTI-PARTY FINANCIAL TRANSACTIONS (A UNIVERSAL PERVASIVE TRANSACTION FRAMEWORK), by Yannis Labrou, Lusheng Ji, and Jonathan Agre, filed Aug. 8, 2002 in the U.S. Patent and Trademark Office, the contents of which are incorporated herein by reference.

BACKGROUND OF THE INVENTION

1. Field of the Invention

The present invention is related to computer communications, and, more particularly, to secure communications between remote computers.

2. Description of the Related Art

Symmetric cryptographic schemes (or algorithms), in which encryption and decryption use the same key, are well known in the art and have several desirable characteristics such as ease of key management and lower computational requirements as compared to asymmetric cryptographic schemes.

Many current security mechanisms employ asymmetric cryptographic schemes, such as the public key systems with their associated Public Key Infrastructure (PKI) systems and are known in the art. However, the PKI (Public Key Infrastructure) system of the related art includes specific costs associated with creating and maintaining this infrastructure. Examples of these costs include key distribution, management and storage.

The asymmetric encryption/decryption algorithms used by the PKI systems involve relatively complex and time-consuming computations. Hence they are not well suited for economical and compact mobile computing devices on which only limited computing resources and battery power are available.

Symmetric algorithms consume substantially less computing power than asymmetric encryptions and decryptions. Communicating parties in symmetric cryptographic systems typically share the same key, which is then used by them as a parameter to encrypt and decrypt the message data.

SUMMARY OF THE INVENTION

An aspect of the present invention is to require less computation on client devices when applying encryption/decryption to plain text data as well as less effort managing the encryption/decryption keys than PKI systems known in the art.

Another aspect of the present invention is to provide a novel, shared algorithm to devise a key without sharing the entire key itself, as compared with other typical secure communication systems based on symmetric cryptography.

A further aspect of the present invention is to provide a method which protects the integrity of a group communication, but does not rely on a shared secret key among the group members. This method not only prevents any party not belonging to the group from participating in group communication; it also detects the absence of any communication group member.

Still another aspect of the Secure Agreement Submission protocol (SAS) of the present invention is that a third party can not attempt to guess the key or parameters of the key derivation scheme through the generation of SAS messages without a high likelihood of detection by the verification party.

The present invention relates to a method of a third party (verification party) verifying an agreement between two distrusting parties (agreement parties) in an insecure communication environment. The present invention extends to a multi-party agreement method, where a verification party verifying an agreement among multiple (more than two) distrusting agreement parties in an insecure communication environment.

The present invention is a computationally lightweight protocol carrying agreement data and other sensitive messages between distrusting agreement parties and a verification party in an insecure communication environment so that the agreement data is protected during the transmission and the agreement data can be shown to be consistent. The protocol of the present invention satisfies security properties such as privacy, authentication, user anonymity, non-replayability and non-repudiation.

The present invention defines a Secure Agreement Submission (SAS) protocol that is designed for use in unreliable communication environments, such as wireless networks. The SAS of the present invention enables multiple parties to an agreement to submit the agreement information to an independent verification party in a secure fashion over these unreliable communication channels. In addition, the SAS of the present invention provides a mechanism and procedures comparing and verifying the agreement information and notifying the participants of the results, also in a secure fashion. As is disclosed herein below, the present invention is ideally suited for many types of transactions such as purchasing goods, wireless voting, virtual token collection and many others.

The SAS of the present invention includes a cryptographic scheme based on a family of symmetric cryptography algorithms, in which encryption and decryption use the same shared key. The SAS of the present invention includes a novel key derivation and generation scheme that can be used with many symmetric cryptographic schemes and results in several new, desirable properties for the protocol, such as a high degree of security in a non-secure communication environment (such as a wireless channel), low computational complexity and no need for a user to store or transmit keys, or other personal identification data pertaining to the attempted agreement, such as username, account data, etc.

The key generation scheme of the present invention uses a mobile computing device capable of communication. The mobile computing device executes the protocol and accepts input from a user. Such devices can be special purpose devices or readily available computing platforms such as Personal Digital Assistants or programmable cellular or mobile telephones.

The key derivation algorithm of the present invention combines information about the mobile computing device with information about the user of the device. The algorithm also combines information that is stored digitally by the device and the shared secret information that is input by the user. Such a combination ensures with high likelihood that only the intended parties are able to decrypt and thus access the communicated data. If a device is lost or stolen, it can not be used without the specific user input information, which itself is not stored on the device. The deterministic key derivation algorithm may be generally known. The set of stored parameters is preferably known only to the device and the verification party, but if generally known are not sufficient to determine the key, without knowledge of the shared secret value. The secret value, or the stored parameters, or the key are never transmitted in a message. What is transmitted is a message parts of which are encrypted with a key that is derived from the stored parameters and the shared secret information that is input by the user.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
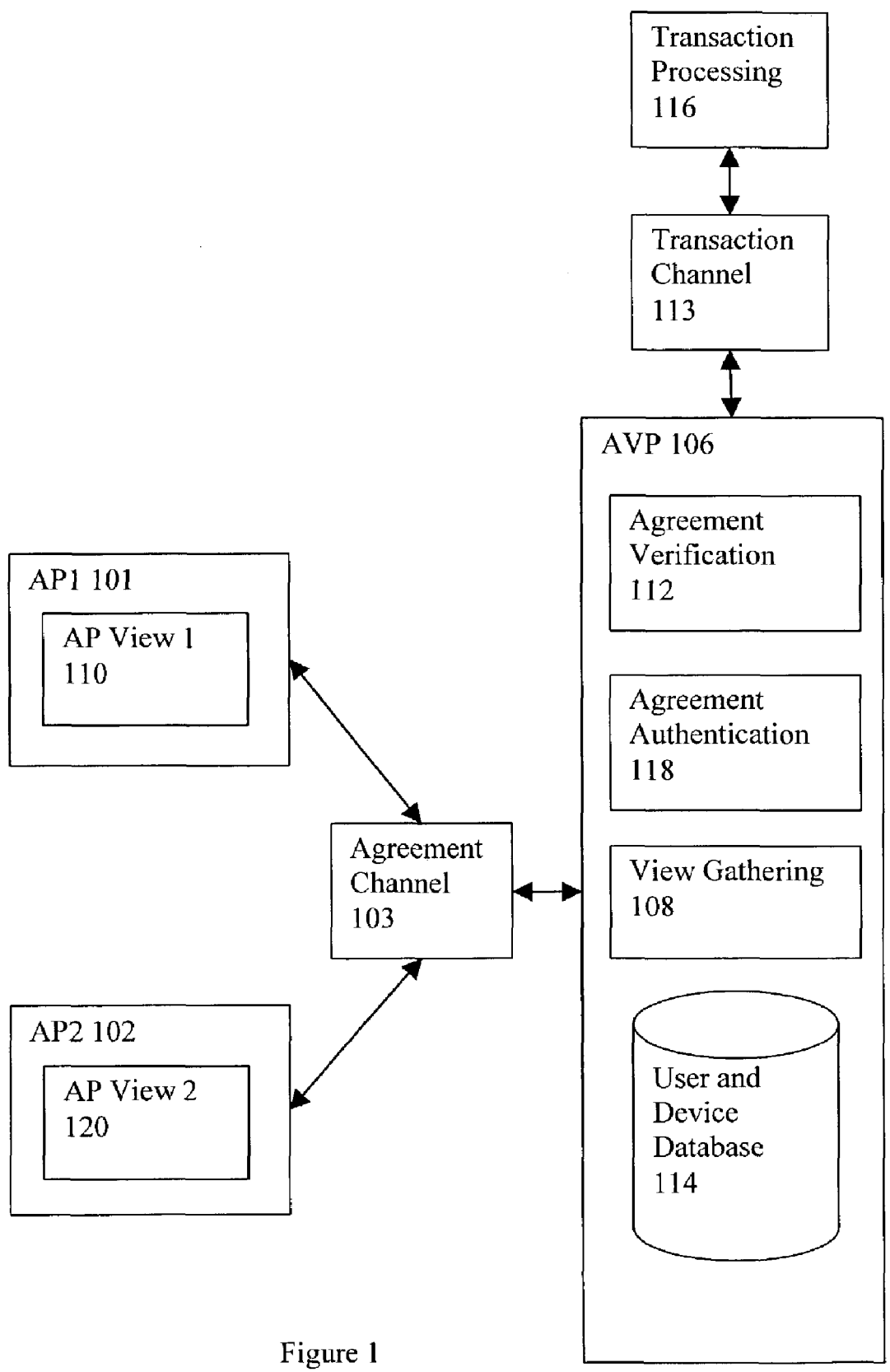
FIG. 1 is an example of a computer system in which the security agreement submission protocol (SAS) view of the present invention is implemented.

An overview of the present invention is now presented.

An agreement, with respect to an application, is a general statement between parties for which a verification procedure can be executed to provide confirmation that the parties have a common understanding of the statement, within the context of that application. For example, a financial transaction agreement could be that "Party A will pay Party B $X for item Y." An agreement statement is represented by agreement data, the contents of which are not defined by the invention but by the needs of the application.

The method of the present invention includes a new protocol, referred to as the Security Agreement Submission (SAS) protocol, to accomplish the agreement verification. An aspect of the present invention is an SAS encryption (SASE) mechanism that provides many security properties in an insecure communication environment. The SASE is used to encrypt and decrypt all messages that are part of the SAS. The SASE mechanism is implemented by each of the agreement parties and the verification party.

The present invention achieves the following desirable security properties:

Authentication of agreement parties: The identities of the involved agreement parties can be determined to be who they claim they are, to a high degree of likelihood by the verification party, based on the fact that a SASE coded message sent by an agreement party can be decrypted and understood by the verification party, using a decryption method with a key that is specific to the sender and only known to the verification party and the specific agreement party.

Authentication of verification party: The identity of the verification party can be determined to be who it claims it is, to a high degree of likelihood by each individual agreement party, based on the fact that a SASE coded message sent by the verification party for a particular agreement party can be decrypted and understood only by that agreement party using a decryption method with a key specific to the agreement party and only known to the agreement party and the verification party;

Anonymity: The agreement parties may remain anonymous to each other, if desired in an application through the use of the SASE method.

Privacy of Agreement: The agreement data sent between the agreement parties and the verification party is protected by SASE so that, if intercepted, no party other than the intended receiver is able to decrypt and read the data. Similarly, response messages from the verification party to the agreement parties are protected.

Tamper-resistance: The agreement data sent between the agreement parties and the verification party is protected through the use of an encryption signature so that no party can alter the data sent by other parties without a high degree of detection.

Non-replayable: Agreement data sent between the agreement parties and the verification party (if intercepted) is protected by an encryption mechanism that incorporates the value of the time when the agreement transaction occurs, and such a timestamp is also included in each message and recorded by the verification party. Thus, no party can replay the agreement data to forge a new agreement because each key is associated with a specific timestamp which is recorded by the verification party in a message log.

Non-repudiation: An agreement party can not later claim that they did not generate an agreement message that has been verified by the verification party except under certain specific conditions that are highly unlikely. These security breeches include the case, where all the secret parameters (the device-specific stored parameters and the shared secret which is input by the user of the device) have been divulged or discovered and the mobile-computing device has been used without the consent of that agreement party. It is also possible for the verification party to generate a false agreement, but it would involve the collusion of the verification party and the other parties to the agreement, which is also highly unlikely. In addition, the verification party will keep records that record the sequence of SAS message exchanges involved in each transaction.

Agreement Group Authentication: The present invention ensures the integrity of the agreement party group (the group consisting of and only of the parties among which the agreement is conducted) so that no other party can pretend to be an agreement party or an agreement party can pretend not to be an agreement party. This is accomplished explicitly by a membership list and identity cross-referencing. It is also assumed that all participants in the agreement are a priori known to the verification party and able to be individually authenticated.

Agreement Verification: The agreement is verified to be consistent among the authenticated agreement parties through the use of redundant and cross-referencing information contained in the agreement data and the use of a verification procedure consisting of basic matching rules and specific matching rules that may depend on the application.

Computational Efficiency: The security mechanism of the present invention is based on private key (symmetric) cryptography that is more efficient than alternative methods.

Physical Security: The security mechanism can be implemented so that it is not necessary to store all of the necessary encryption information on the client mobile computing devices, thus making it easier to protect the secret information if the device is compromised. Specifically, the shared secret input by the user is not stored on the device. Also, when the device is used in a particular application context, user-identifying information is not stored on the device. For example, when the device is used for purchasing goods and service in physical retail stores, the name of the consumer, or the user's account information is not stored on the device.

Intrusion Detection: The security mechanism is centralized through the use of an independent verification party so that attempts to use the system by unauthorized users that rely on multiple access attempts are easily detected and handled accordingly.

With the above-mentioned aspects of the present invention, the present invention is ideal for being used as a vessel to carry financial transaction data between distrusting parties in an insecure communication environment. It is also well-suited for a system using low-cost user devices, which have limited computing resources.

The present invention is now explained with reference to FIGS. 1-8.

Architecture

The overall architecture of a system 100 for agreement verification between two parties using the SAS of the present invention is shown in FIG. 1. The system 100 comprises two Agreement Parties, AP1 (101) and AP2 (102), an Agreement Communication Channel (103), the Authentication and Verification Party AVP (106), a Transaction Communication Channel (113) and Transaction Processing Component (116). The AVP 106 itself comprises four components, the View Gathering Module (108), the Agreement Authentication Module (118), the Agreement Verification Module (112), and the User and Device Database (114).

Referring now to FIG. 1, AP1 101 generates agreement information in the form of AP View 1 (110) and AP2 102 generates agreement information in the form of AP View 2 (120). The Transaction Processing Component 116 and its associated communication channel are not part of the present invention, but are included to further illustrate the application environment for the present invention. It is assumed that the Transaction Communication Channel 113 is a reliable and secure channel.

The present invention assumes that the Agreement Channel 103 is a reliable, although insecure, communication channel between the APs 101, 102 and the AVP 106. All messages that are part of the SAS protocol are encrypted/decrypted using the SASE. In addition, the AVP 106 is considered to be located in a secure facility, so that the sensitive information in the User and Device Database 114 is sufficiently protected.

The SAS agreement verification process of the present invention is described as the following six functions. More details of each function are provided in the later sections:

Function 1: Each Agreement Party (AP) 101 or 102 creates the AP View 110 or 120 including agreement data and additional parameters. Sensitive portions of the view 110 or 120 are encrypted using the SASE of the present invention. The AP View 110 or 120 is digitally signed by the AP 101 or 102, respectively. An Agreement Message is created from the view 110 or 120 and then transmitted to the Authentication and Verification Party (AVP) 106 using the Agreement Communication Channel 103.

Function 2: The AVP 106 receives the agreement messages from the APs 101 or 102 and delivers them to the View (or Agreement) Gathering Module 108. The View Gathering Module 108 determines that this is a two-party agreement and when it has received two agreement messages (one from each party) for this particular agreement. The messages are then passed to the Authentication Module 118.

Function 3: The Authentication Module 118 authenticates the agreement parties by using the SASE of the present invention to decrypt the agreement messages, and determines that the signed agreement copies are indeed signed by the involved APs 101 or 102. This is done through the properties of the SASE scheme and using the information stored in the User and Device Database 114. If authenticated, then the decrypted messages are passed to the Agreement Verification Module 112. If the authentication fails, then the results are sent to the Agreement Parties 101 or 102 as indicated in Function 6.

Function 4: The Agreement Verification Module 112 executes a set of matching rules that check to determine whether the agreement data in each of the agreement messages 110 and 120 is consistent with each other. There are several matching rules that are always applied as well as an interface for application-specific rules. Together these matching rules are checked to verify that the agreement data included in all received copies of the agreement is consistent. Typically, in each agreement message there is reference to the other parties of the agreement and possibley a reference to a user identity that is not public information (for multiple users per device case). In addition, each application of the present invention can provide a plug-in function to verify that the application specific contents of the agreement received from the agreement parties agree with each other. For example, in a financial transaction, there is an agreed upon amount that can be matched among the parties. If there is no associated transaction processing, then the system proceeds to Function 6. Otherwise, Function 5 is then executed.

Function 5: In many applications, once the agreement details have been verified, it is desirable to perform some services based on the contents of the agreement. In this case, the decrypted agreement data is passed to the Transaction Processing Component 116 to execute these services using the Transaction Communications Channel 113. The Transaction Processing Component 116 will typically create response messages for each agreement party following the processing of the transaction. The response messages are communicated back to the Agreement Verification Module 112 through the same channel.

Function 6: The Agreement Verification Module 112 creates a Response Message for the Agreement Parties 101 or 102 that includes the results of the verification. If there is a response from a Transaction Processing Component 116, then this is also incorporated into Response Messages. The Agreement Verification Module 112 passes the response messages to the Agreement Authorization Module 118 that uses the SASE of the present invention to encrypt response messages for the Agreement Parties 101 or 102 and transmit the response messages to the agreement party 101 or 102 over the Agreement Communication Channel 103.

The agreement method of the present invention is summarized herein above. However, in order to operate such a system 100 implementing the agreement method of the present invention, there are several additional functions that occur. Prior to joining an agreement, any AP 101, 102 who wishes to use the verification service must be registered with the Authentication and Verification Party (AVP) 106. The registration process results in a user account being created for the AP 101 or 102 at the AVP 106 and necessary information stored in the User and Device Database 114. A registered AP is hence known as an AP User of the system.

Registered APs 101, 102 are assumed to employ devices, called AP Devices or Client Devices. Each device is capable of carrying out the computations necessary for the verification procedure (including the encryption of outgoing messages and decryption of incoming messages intended for this particular device) and of reliably communicating with the AVP 106 over the Agreement Communication Channel 103. Each device is also registered at the AVP 106, together with the key derivation parameters stored in the device (e.g., pseudorandom number generator and its seed, etc). In addition, the association between the AP users and their devices is also stored in the User and Device Database 114 at the AVP 106.

It is possible to allow the cases where each device may have multiple AP users associated with the device or each AP may be associated with multiple devices. Depending on the requirements the application of the present invention, the multiple users per device may or may not be permitted. For instance, if a particular application of the present invention issues one and only one device for each registered AP user, it is no longer be necessary for the AVP 106 to distinguish the user from the device and the data items for each user may be stored together with the data items for the device issued to the user. During normal operations, the system 100 may use the identifier of either as a reference to locate these data items. This results in more efficient processing than in the multiple user case.

The User and Device Database 114 is also used to log and store the records of each agreement session by recording the SAS messages to and from the agreement parties 101, 102 and the AVP 106. Each such agreement transcript can be accessed by the user, device or transaction IDs. This can be used to prevent replay of transactions by reusing a timestamp and to resolve potential claims regarding the verification procedure and the parties involved.

Security Protocol

The security protocol, termed the Secure Agreement Submission Protocol (SAS), is explained in more detail in this section. As part of the description the terms used in the protocol are defined.

Device ID (DID): A unique identifier for each AP (client) Device involved in the agreement generation, transmission, authentication, and verification. This ID is public in the sense that it may be included in messages as plain text, i.e., in non-encrypted form and that it is placed in the non-encrypted part of the message. It can also be used as the address of the device during communication. For instance, the physical address of the network interface (MAC address) of the device can be used for this purpose.

User ID (UID): A unique identifier for each registered AP entity involved in the agreement. That is, the human or entity using an issued AP client device involved in the agreement generation, transmission, authentication, and verification. This UID is used to identify the current user of an AP client device and there is a one-to-one mapping between the UID and an account opened at the AVP 106. This piece of information is private in the sense that the UID must not be transmitted in plaintext during the protocol execution. Examples of a UID include a name, an e-mail address, a driver's license number, or some account id. The UID is only needed in case the client device has multiple users and is needed to identify the specific user (of many) of the device that is attempting the transaction. The UID may or may not be stored on the device depending on the security needs. If the device has only one registered user, the UID is unnecessary, thus allowing to not store any user-identifying information of the device at all.

Private Identification Entry (PIE): The shared secret input by the user. It is entered by the user whenever the user attempts a transaction. Preferably it is issued to the user following the registration of the user for the application that the client device is used for. It can also be selected by the user at such time. The PIE is an alphanumeric string. In order to speed up the user entry to make it easier for the user to remember it, the PIE can be a number such as 4-digit or 5-digit PIN. It is a piece of highly secure information in the sense that it is never transmitted during the protocol execution, it is only known to the user and the AVP 106, and its secrecy should be well protected. It is assumed that the PIE can be input by the user on an AP device in a secure fashion or it may be deterministically generated using a biometric device such as a fingerprint sensor. For example, a computation applied on the fingerprint data received from the fingerprint sensor can be used to generate a PIE that is initially communicated to the AVP by the user. Whenever the user attempts a transaction, the user applies her finger to the fingerprint sensor, thus generating the PIE. The PIE is not kept in permanent storage on the AP device, but is used as an intermediate parameter required for the generation of the encryption key for a transaction and it should not be retained by the device for a period longer than the transaction execution time. If a particular implementation of the present invention uses a form of PIE that is not convenient for a user to input for each agreement transaction and the device needs to store its user's PIN, the storage must be secure and tamper-resistant. The user's PIE is also stored in the User and Device Database at the AVP, which is considered to be a secure facility.

Device User ID (DUID): An identifier for each device to locally identify its users, if the application of the present invention assigns multiple users to a single AP device. The mapping between the DUIDs of a particular device and the assigned users' UIDs is stored in the record of that device the User and Device Database at the AVP, as well as at the device itself. At the same time as a user inputs her PIE at an AP device, she shall also supply her DUID. The DUID is public in the sense that it may be transmitted as plaintext in messages. The DUID of the current user may be stored at the AP device during the execution of a transaction.

Digital Signature (DS): A digital signature associated with a message can be used to verify that a document has not been tampered with and that it was generated by the signer. For a given block of data, a message digest (MD) can be computed using a digest algorithm such as a Hash function. The resulting digest is then encrypted using the encryption key of the signer and the resulting encrypted block of bits is the signature. In order to verify a signature, the recipient decrypts the signature using the key of the sender. If the receiver generates a digest value from the received message which matches with the digest decrypted from the received signature, then the signature is accepted as valid and the received message is considered to be the original unaltered message.

Random Sequence Number (RSN): The RSN is a pseudorandom number that is generated from a locally stored pseudorandom sequence number function R (a pseudorandom number generator). Such RSN functions are well known in the art. Typically the generation of a pseudorandom number also involves another parameter, a seed S. The seed is used as the initial input parameter for the generator R to generate its first pseudorandom number output. From then on, the generator uses the output from the previous iteration as the input for generating the new pseudorandom number. In the SAS of the present invention, the RSN number may be generated either by an AP device or the AVP. Each AP device has its own R and S, which are securely stored on the device and at the AVP. On the AVP, given the DID of an AP device by which a RSN is generated, a program can deterministically locate the same pseudorandom number generator function R and the corresponding pseudorandom number generation seed S for that device from the User and Device Database containing information about all issued devices.

Timestamp (TS): The time associated with a transaction. It can be generated from a reading from a per-device local clock or delivered to the device on a per transaction basis. For example, if the device is used in a purchasing application, the TS can be the TS of the purchase order that the merchant and the consumer will agree on. The TS should be an element of an increasing sequence of values with a known and generally long period between repetitions of values. It is used for two purposes: as an indicator of a device's local time and as a parameter to control the pseudorandom sequence number generator of the same device. In the former case, the TS is used to prevent message replay, as no two messages from a given source should have the same TS. In the later case, the TS is used to control the number of iterations of the generator R before the final output is used as the next pseudorandom number by the SASE.

Transaction: The complete execution of one agreement transmission, authentication, and verification. On an AP Device, a transaction begins when the device generates its view of the agreement and ends when a receipt from the AVP is received and understood. A specific application might include multiple such transactions in order to accomplish the goal of the application. For example, if the application is that of a consumer purchasing goods or services from a merchant, a first transaction might be that of acknowledging and pre-authorizing the purchase and a second transaction might be that of confirming and authorizing the purchase after the completion of the first transaction (when an adequate response is received from the AVP)

Transaction ID (TID): A unique identification number assigned to an agreement. The method of generating the TID is generally application specific and it can be generated by one of the agreement parties or a component of the AVP, such as the View Gathering Module. The Gathering Module will use the TID and an additional parameter, Number in Transaction (NIT), that specifies the number of parties in the agreement, to identify when it has received a complete set of views for an agreement. In a two-party agreement, the TID and NIT may not be required.

View: The processed agreement data by an AP device. A view of an agreement consists of an encrypted portion and an unencrypted portion. The encrypted portion includes reference information (the other party's Device ID, and optionally the User ID, a message digest MD, which can also be digitally signed) and the specific agreement data. The unencrypted or plaintext portion consists of reference information including Transaction ID, Number in Transaction, Time Stamp, Device ID and Device User ID.

Figure 2:
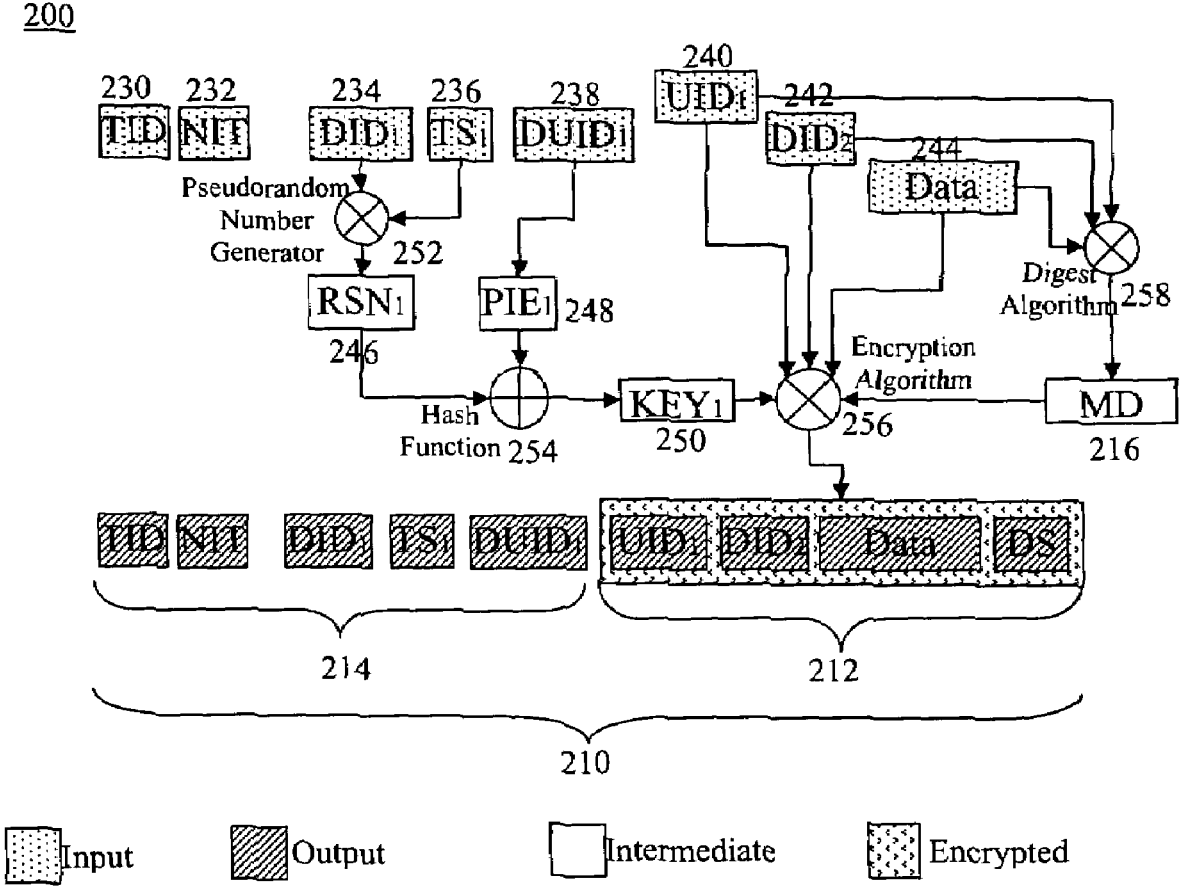
FIG. 2 shows a method of encrypting a security agreement submission protocol (SAS) view of the present invention.

Agreement Data: The agreement data conveys the specific details that are agreed upon by the involved parties. For example, the amount that one party agrees to pay a second party is a agreement data. Agreement data may also contain information that is relevant to the agreement, but needs to be shielded from the other agreement parties. For example, the financial account with which one party agrees to pay the second party may be included in the agreement data, but this is not protected from the second party through encryption. The agreement verification module will be configured to determine that both parties agree on the amount and the participants, while protecting and delivering the other agreement data, such as the account information for the appropriate additional processing, such as by a Transaction Processing Component 116. The primary purpose of the SAS and the cryptographic algorithm is to protect the agreement data during transmission and to shield the other information from the other agreement parties, while providing the security properties of privacy, authentication, user anonymity, non-replayability and non-repudiation The method 200 of encrypting an SAS view of the present invention, referred to as the SASE, is illustrated in FIG. 2. The SAS view 210 illustrated in FIG. 2 corresponds to an AP View 110, 120 of FIG. 1. As shown in FIG. 2, an AP view 210 includes a cipher text part (or encrypted part) 212 and a plaintext part 214. The plaintext part 214 includes the TID, the NIT, the DID of the AP device generating the view, the local TS of that AP device, the DUID of the current user of the device, the TID and the number of parties in the agreement. The encrypted part 212 includes four fields: the digital signature DS 216, the agreement, the UID of the AP, and the DID of the other AP involved in the agreement. The DID of the other AP involved in the agreement is the minimum necessary reference field in order to provide the desired properties of the SAS protocol. The DS further increases the strength of the security by ensuring that no other party has tampered with or modified the contents of the view in any way. The TID and NIT are not necessary in a two-party agreement. The purpose of the TID and NIT is to associate views (messages) and responses to these messages and, alternatively, information that relates messages and responses to these messages can be provided as part of the agreement data itself in a way that depends on the particular application.

In the case that the AVP only allows one user to be associated with each device, the UID field may be omitted because the AVP can derive such a UID based on the DID. The UID of the other party involved in the agreement is not included in any view, so that the other AP involved in the agreement may remain anonymous. The DUID field is also not necessary in this case.

At first, the DID 234 of the view generating device and the TS 236 obtained from the device's local clock or provided as a part of the agreement data, are input to the device's pseudorandom number generator 252 to generate a RSN 246. In the SASE, the TS 236 is used to control the number of iterations of the pseudorandom number generator 252. Only the final result after these iterations is used as the output RSN 246 for the SASE.

There are several variations in how the TS is employed to generate the RSN. One method of using the TS to control the number of inductions is to use the difference between the TS value (in number of minutes or seconds) and another mutually agreed base time value as the number of inductions. The generation of RSN is denoted as: $RSN=R(S, TS, T_0)$ where $T_0$ is the base time. The base value $T_0$ is stored both at the AP and the AVP which will store the base value in the User and Device Database in the record for the AP device and is specific to each AP device. The mutually agreed base time is advanced on both the AP device and the AVP in order to reduce the number of inductions to produce a SASE RSN, as long as the advancement of the base time on AP and AVP can be synchronized. If desired, as the base time advances, the seed may also be updated. For example, the new seed S' may be the S'=R (S, $T_0$', $T_0$) where S is the original seed, $T_0$ is the original base time, and $T_0$' is the new base time. The property of the SASE that needs to be maintained is that given a particular sender's pseudorandom sequence number generator R, its seed S, and the same TS value as used by the sender, the receiver can deterministically reproduce the same RSN as was generated by the sender A hash function H 254 is then applied to the output of two-argument function F that when applied to the locally generated RSN 246 and the PIE 248 input by the AP user outputs a single argument (typically a string), in order to create the encryption key K 250:

$$K=H(F((PIE, RSN)) \text{ or further expanded to: } K=H(F(PIE, R(S, TS, T_0)))).$$

Such Hash functions are difficult to invert and are well known in the art. The function can by any known function, such as a function that appends the PIE string to the RSN string, or XOR's the PIE and the RSN, etc.

A message digest function 258 is applied to the data, the UID of the AP user, and the DID of the other AP involved in the agreement to generate a message digest (MD) 216 of the view. The message digest function 258 can be a hash function that takes as input the plaintext of these three data items and produces a single number. Such hash functions for use in producing message digests are also well known in the prior art. For example, the hash function SH1 is often used for this purpose.

The encryption algorithm with the encryption key K 250 is then applied to the message digest 216, the agreement data 244, the UID of the AP user 240, and the DID of the other AP involved in the agreement 242 to generate the cipher text part 212 of the view. The DID 234 and TS 236 which were used to generate the encryption key are also included in the view as plaintext. The TID 230 and NIT 232 are also included in the plaintext part 214 of the view. Thus, the agreement view 110 from the first AP device is the following:

AP View 1={TID, NIT, $DID_1$, $TS_1$, $DUID_1$, Encryption [$K_1$: ($UID_1$, $DID_2$, data, $MD_1$)]}

The specific encryption algorithm employed by the system 100 can be any of the known symmetric key-based encryption algorithms chosen to provide sufficient protection. However, the present invention includes the key generation process to be used with the chosen encryption algorithm.

As one embodiment of the SASE, the encryption algorithm 256 is TripleDES, the Random Number Generator 252 is a Mersenne Twister, the seed is a 32-bit number, the time-stamp is a 64-bit number representing seconds, the PIE is four digits, and the Hash function 254 is SHA1 and the function F that generates the input to the Hash function, is a function that appends the PIN to the RSN.

For further protection, the SAS protocol uses message padding in order to further prevent "known-text" attacks. In "known-text" attacks, an attacker who knows the plaintext of the agreement will attempt to reverse engineer the encryption key and eventually, with enough successful attacks, the other parameters used by the key derivation process. If successful, the attacker becomes capable of reproducing the encryption key for that particular view. Since the key changes over time (each timestamp is associated with a new key), this attack would reproduce the key for that particular timestamp only. Further transactions using the same timestamp are denied through comparison with the previous transaction timestamps stored at the AVP.

Figure 3:
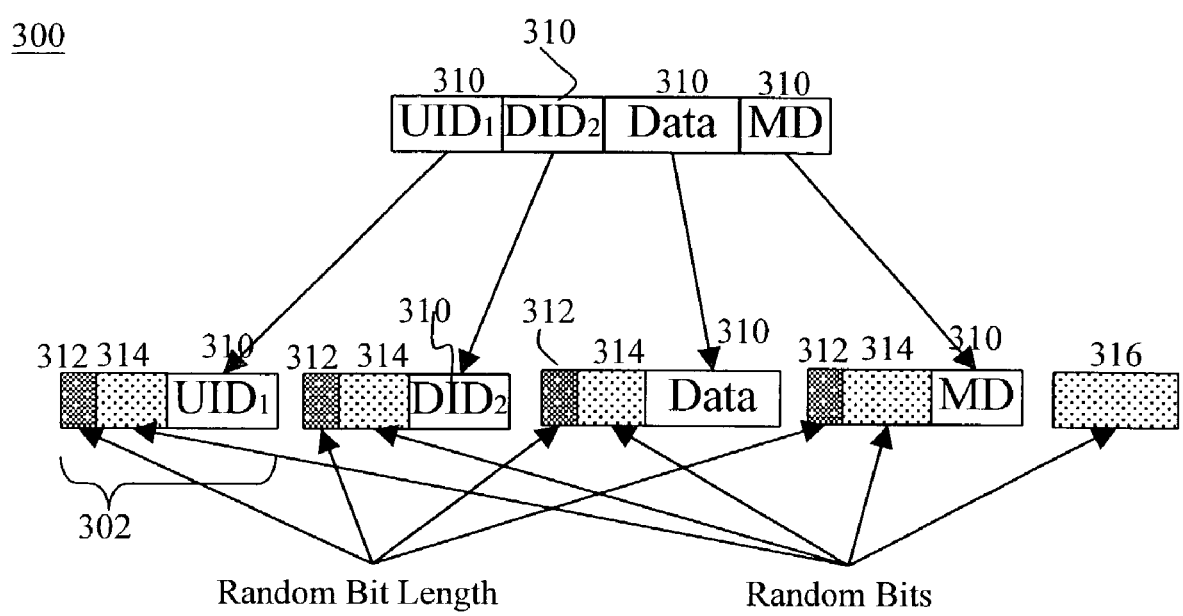
FIG. 3 shows a method of decrypting a security agreement submission protocol (SAS) view of the present invention and how the cross reference fields are matched.

The padding scheme will insert random bits before and after the real fields so that an observer cannot determine where the real data begins, increasing the difficulty of "known text" attacks. The amount of padding is determined by the lengths of the overall message and the included data. In one embodiment of padding 300, as illustrated in FIG. 3, a padded field 302 starts with a field of fixed length 312, which describes the number of random bits inserted before the actual encrypted fields. This field 312 is followed by a string of random bits 314 of the length specified by this field 312, and then the real data field 310. Random tailing bits 316 are also appended after the end of all encrypted fields to further increase the difficulty for an attacker to extract the real cipher text part of a view. Since the total length of each field is known, it is not necessary to specify the length and offset of the tailing random bits 316. If the length of each field is not known, field 312 will be followed by an additional field that specifies the offset of the tailing random bits 316. In another embodiment, random bits are inserted only before and after all fields. In this case although the difficulty for an attacker to determine the location of each data field is reduced the processing of each SASE message is also reduced. Padding is applied before encryption is applied during view construction.

This completes the description of the SASE mechanism for generation of a secure message by an AP. A similar procedure is defined in a later section for decryption of the message at the AVP.

View Gathering

At the AVP 106, the Views 110,120 belonging to the same agreement transaction but generated by different AP devices will first be gathered together by the View Gathering Module 108 before any further authentication and verification processing. When all the views of an agreement are collected, they are given to the Agreement Authentication Module 118.

The SAS of the present invention permits agreement parties to be involved in multiple, simultaneous transactions with differing parties. In addition, multiple transactions from differing parties can also be simultaneously active at the AVP 106. In general, the view gathering function decides which views belong to the same agreement transaction and at what point the gathering is completed so that all views belonging to the same agreement transaction can be forwarded to the authentication module 118. A TID must be used to tag each view of an agreement so that the gatherer can match the views belonging to the same agreement and process them together.

The View Gathering Module 108 uses the TID in each message to match the views. When the View Gathering Module 108 has collected the proper number of distinct views, given by NIT, the View Gathering Module 108 will forward the set of views to the Authentication Module 118. The parameters TID and NIT are sent in plain text so that the View Gathering Module 108 can operate on the views prior to authentication and decryption. This permits greater flexibility in that the View Gathering Module 108 can be physically separated from the AVP 106. In order to insure the integrity of the TID and NIT, the TID and NIT are repeated in the agreement data. For this purpose, the TID and a list of DIDs of the AP devices involved in the agreement are included in the encrypted portion.

In alternative implementations, the TID and NIT are only included in the encrypted portion of the message and must be decrypted and authenticated (by the Agreement Authentication Module) prior to handling by the View Gathering Module. In this case, the View Gathering Module holds the decrypted views until a complete set is obtained.

The View Gathering Module 108 holds unmatched views of a Transaction for a maximum period of time, called the Transaction Time-out period. After this time has elapsed without collecting a complete set of views, the views are discarded and, optionally, the agreement parties are notified.

Decryption

The views 110,120 are decrypted at the AVP 106 by the Agreement Authentication Module (AAM) 118.

Figure 4:
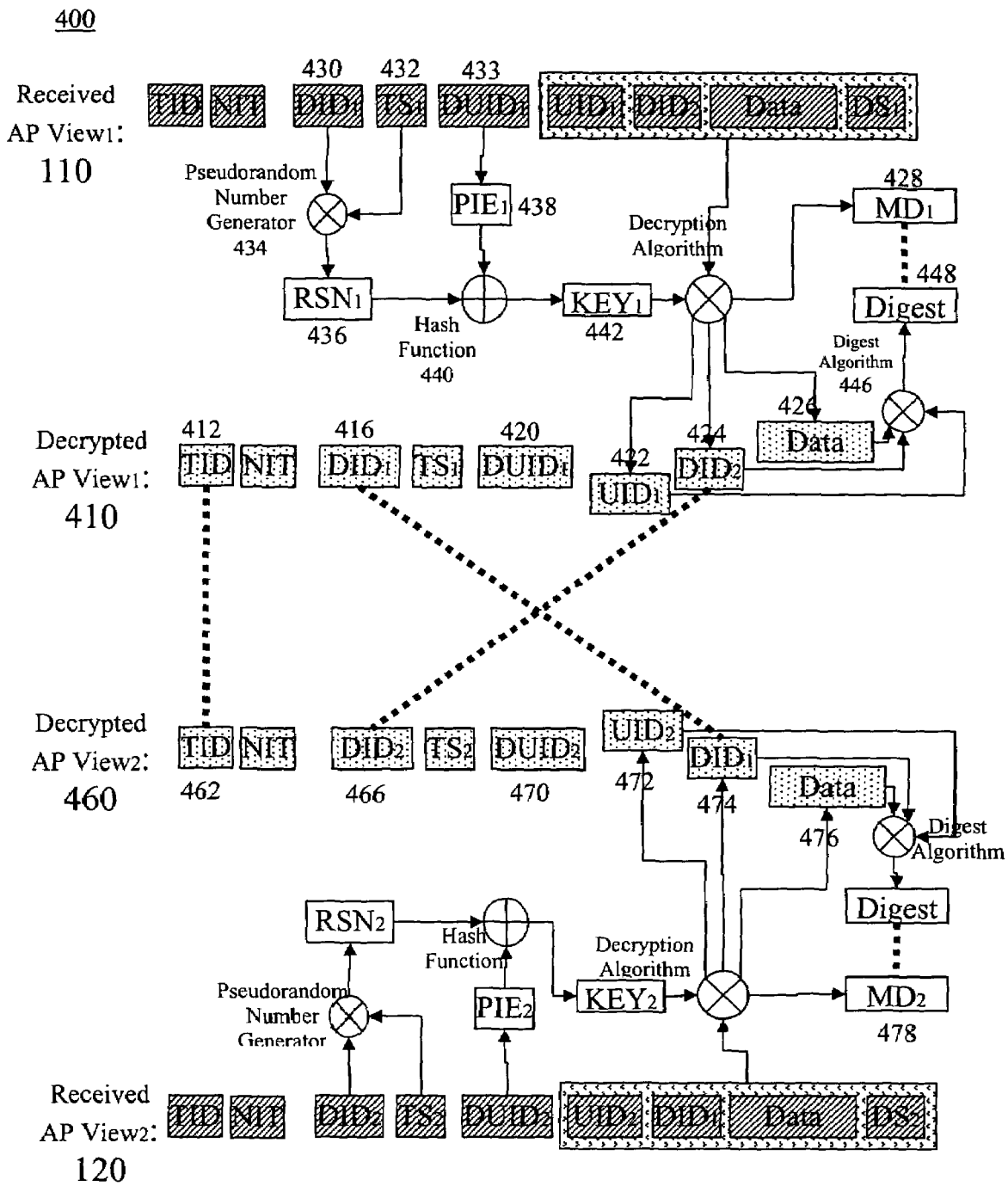
FIG. 4 is another example of a computer system in which the security agreement submission protocol (SAS) view of the present invention is implemented.

FIG. 4 shows a detailed explanation of the procedure followed by the AAM 118 and the Agreement Verification Module (AVM) 112. More particularly, FIG. 4 shows a method 400 of decryption of the above-mentioned AP View 1 110 and AP View 2 120, into decrypted AP View 1 410, which includes in plaintext TID, NIT, TS1, DID1, DUID1, and decrypted AP View 2 460, respectively which includes in plaintext TID, NIT, TS2, DID2, DUID2.

Initially, when the views 110 or 120 are received, it is useful for the AAM 118 to check the validity of the TS of the views. This operation may prevent attacks conducted by changing an AP device clock or replaying an intercepted view. For this purpose, the AVP 106 stores a clock offset value for each AP device 101, 102 in its User and Device Database 114. This offset describes the difference between the device 101, 102's local clock and the system clock of the AVP 106. With the offset and the TS, the AVP 106 can verify if the message generated by such a device 102, 104 occurs within a reasonable time-window before the message arrives at the AVP 106. Only messages generated during this period are accepted. Otherwise an "Expired Transaction" error message is generated and sent back to the APs using a method described later in this section. The size of this time window, and the accuracy of the clocks would depend on the requirements set by the application of the present invention.

Referring now to FIG. 4, when the AAM 118 is decrypting a transaction view message 110 from a client 101, based on the plaintext DID field 430 of the view 110 the AAM locates the corresponding pseudorandom sequence number generator R 434 and seed S for the device 101 which generated the received view 110 using the User and Device Database 114. Then using the TS 432 also contained in the AP View 110 as plaintext, the AAM can inductively reproduce the RSN 436 which is identical to the RSN 246 (of FIG. 2) used during the derivation of the encryption key. Because the TS value which is required for the AAM to determine the RSN of the view generating AP device 101, 102 is enclosed in each message, it is not necessary for the AAM 118 and the AP devices 101, 102 to have synchronized clocks for RSN derivation purposes.

The AAM 118 then locates the current user of the AP device 101 in its User and Device Database 114 using the DUID field 433 of the view. By looking into the record for the AP's current user, the AAM 118 finds the corresponding PIE 438 of the user. Then the AAM 118 reconstructs the encryption key 442 (250 of FIG. 2) used for generating the view 110 by using the same Hash function 440 (245 of FIG. 2) used by the AP. With the encryption key known, the AAM can decrypt the full view message contained in the view 110. After the decryption, if random bit padding was applied during the construction of the view, the padding bits are removed to reveal the true data fields. After the encrypted fields are decrypted, the UID 422, the DID of the other party 424, and Data 426 are fed into a digest algorithm 446, which is identical to the digest algorithm 258 used by AP device, to produce a digest 448. This digest 448 is then compared with the MD 428 resulted from decrypting the digital signature contained in the received view. Only if both digests are the same, the digital signature is considered correct. Otherwise, the view is considered altered from the original. The same procedure takes place for the received AP view 120 in order to ensure that MD2 478 corresponds to data 476.

If the AAM 118 is not able to successfully decrypt the message or the digital signature is not correct, then the authentication is deemed to have failed. The AP's will be notified through an "Authentication Failed" response message.

The above described SASE encryption scheme and key generation method is also used by the AVP 106 to encrypt response messages such as errors or, acknowledgements or receipts that are sent back to APs 101, 102. In general, the response can also contain arbitrary application specific data. For example, it can be used to transmit special tokens generated by the Transaction Processing Component 116 for AP users for later use.

Specifically, using the same basic SASE encryption method, to send a response message to $AP_i$, the AVP will use the destination AP parameter $DID_i$ to determine the random number generator $R_i$, the $Seed_i$ and a TS determined by the AVP to generate the RSN. Next, the destination APs current user's $PIE_i$ RSN and Hash function are used to generate the encryption key K. A Response Message to $AP_i$ has the following fields and is formatted as:

ResponseMessage$_i$={TID, DID$_i$, TS, DUID$_i$, Encryption [K: (MD, data)]}.

ResponseMessage$_1$, is then transmitted to APi. When received, APi is able to use the plaintext parameters in the message and its internal parameters to derive the decryption key and decrypt the message. During this process, the AP device may use the included DUID to prompt its user for a PIE if the PIE is not cached at the device.

In certain situations, because we are using a symmetric cryptography algorithm, in which the same key K derivation procedure can be carried out by either side, the above described AVP response message can be generalized for carrying arbitrary application data in messages.

When used for sending error messages and receipts back to the APs, the return messages are sent in a reversed path along the Agreement Channels to the APs. If the views are sent separately from each APs (via gathering function) to the AVP, the return messages are also sent independently to the destination APs. Such reverse communication does not need to go through the view gathering module. However, each return message does need to include sufficient information, such as the agreement TID in the message, so that the receiving AP device can identify to which agreement transaction the return message belongs.

Agreement Verification

After both views 110, 120 are successfully decrypted, the AVP 106 verifies the agreement using the Agreement Verification Module 112 that executes a procedure consisting of a list of matching rules to be applied to the agreement views. A series of basic matching operations between the fields in the views 110, 120 are carried out and then optionally, application specific matching rules can be applied. The basic matching operations are illustrated in FIG. 4 and include:

The DID included in each view's plain text part matches with the DID of the other party included in the other view's encrypted part. That is, 416 matches with 474 and 466 matches with 424.

The UID included in each view's cipher text party matches with the current user of the view generating device as determined by the view generating device's device ID and the current user's DUID. That is, the user ID derived from $DID_1$ 416 and $DUID_1$ 420 should matches with $UID_1$ 422 included in the encrypted part of the view. The same matching rule applies to $DID_2$ 466, $DUID_2$ 470 and $UID_2$ 472.

The Transaction ID, TID 412 (or 462), of each view is matched with the TID 462 (or 412) of the other party. In addition, the plaintext NITs are verified by counting the listed DIDs in each view.

If one of the matching rules is fails during the examination, the verification process is stopped and "Verification Failed" error messages are sent back to both APs using the return message method described earlier. For example, error messages are generated as the following with error1 and error2 being an error code or a descriptive message which both the APs and AVP can understand:

ErrorMessage1={TID, $DID_1$, $TS_1$, $DUID_1$, Encryption [K:(MD, error1)]}

ErrorMessage1={TID, $DID_2$, $TS_2$, $DUID_2$, Encryption [K:(MD, error2)]}

The next step is for the AVP to verify that the agreement data included in each view's cipher text part matches with each other according to the needs of the application. The SAS is a submission vessel protocol for agreements. Thus it does not define the format and specification of the agreements it carries. Therefore, to accommodate the application in determining whether two agreements really semantically agree with each other, an interface is provided by the AVP so that each application may provide its own additional agreement verification rules for verifying that the agreements included in the views are consistent with each other.

For example, a simple application independent plug-in procedure that can be used is a bit-matching function. If two agreements are exactly the same, bit by bit, the matching test is passed. More complex plug-ins may involve application specific cryptographic operations and semantic correspondence.

The Agreement Verification Module 112 may be physically implemented on the AVP, together with the authentication processing implementations. Alternatively, the verification process can be implemented on a different device but able to communicate with the other modules in the AVP through a reliable and secure communication channel.

At the completion of the verification process, the AVP may forward the agreement data decrypted from received views to a Transaction Processing Component 116. However, in this case the communication between the AVP 106 and the Transaction Processing Component carrying out the verification processing must be secure, if not co-located. From the SAS perspective, the agreement data extracted from each received view is already verified by the AVP.

Because of the additional communication, a timeout mechanism may be included so that if no reply is received from the Transaction Processing Component 116 process within a certain time, the AVP 106 sends error messages back to the APs 101 102

When in an application of the present invention the Transaction Processing Component 116 is physically located on a different device than the AVP 106, the application may employ additional cryptography techniques to offer additional privacy features. For example, each AP may apply additional encryption to the agreement data before it applies SAS encryption. This pre-encryption can only be decrypted by the Transaction Processing Component 116 process, which is not co-located with the AVP. Thus, even the AVP will not be able to discover the contents of the agreement beyond the information needed for basic matching.

At the end of the verification process, application specific receipts may be generated for the AP's 101, 102 describing the result of the verification.

ReceiptMessage$_1$={TID, $DID_1$, $TS_1$, $DUID_1$, Encryption [$K_1$:(MD, receipt$_1$)]}

ReceiptMessage$_2$={TID, $DID_2$, $TS_2$, $DUID_2$, Encryption [$K_2$: (MD, receipt$_2$)]}

The receipts are sent back to the APs using the method for the AVP to send messages back to APs, as describe earlier. It is important to point out that the contents of the receipts do not need to be understandable by the components of the AVP. This is different from the error messages generated by the authentication process of the AAM. The reason for this distinction is to separate the results from authentication processing from the results from the agreement verification processing. This separation gives the applications of the present invention more capability to include additional features. For example, when there is an additional Transaction Processing Component 116 that is physically separated from the AVP, the agreement verification process may include confidential information in its receipts. It is not necessary to allow the AVP to understand the contents of the receipts.

The departure from the AVP of the receipt or error message for the last AP involved in the agreement marks the end of an agreement authentication and verification transaction at the AVP 106. The arrival of a receipt at an AP 101 102 marks the end of an agreement authentication and verification transaction at the AP.

AP View 1 110, AP View 2 120, and Agreement Verification 106 are implemented in respective software programs which, when executed by a computer, cause the computer to execute the respective functions described herein above. Each of the programs can be stored on a computer-readable medium.

Extensions of the SAS Protocol

The above SAS protocol description is presented for agreements between two parties. However, the SAS protocol of the present invention can be extended for agreements involving more than two parties. In this case, for a transaction involving n parties, the transaction view message from the i-th participant is:

ViewMsg$_i$={TID, NIT, $DID_i$, $TS_i$, $DUID_i$, Enc [$K_i$:(MD$_i$, TID, $UID_i$, $DID_0$, . . . , $DID_{i-1}$, $DID_{i+1}$, . . . , $DID_{n-1}$, agreement)]}

Correspondingly, the verification and authentication rules are:

ViewMsg$_0$.DID$_i$== . . . ==ViewMsg$_j$.DID$_i$== . . . == ViewMsg$_{n-1}$.DID$_i$, where i=0 . . . n−1

For all i's (i [0, n−1]), using ViewMsg$_i$.UID$_i$ and DUID$_i$ to search the User and Device Database for the reference UID. This UID should be the same as UID$_i$ included in the encrypted part of the ViewMsg$_i$.

ViewMsg$_0$.TID== . . . ==ViewMsg$_j$.TID== . . . == ViewMsg$_{n-1}$.TID, where i=0 . . . n−1

ViewMsg$_0$.NIT== . . . ==ViewMsg$_j$.NIT== . . . == ViewMsg$_{n-1}$.NIT, where i=0 . . . n−1, and NIT is equal to n, the number of parties listed in the agreement.

The submission methods of the views in a two AP system are extended to agreement transactions involving more than two APs. If the view gathering and generation processes are separated, exactly the same methods used by a two AP system can be used for a system with more than 2 APs. The View Gathering module collect views from all parties in the agreement using the TID and NIT included in the message.

When the view gathering function is implemented separately from the view generation function, the view gathering function can be physically implemented at an external device (in which case the APs send their views to this view gathering device then the view gathering device forwards all views together to the AVP.

Alternative View Gathering Methods

In an alternate version of the invention, called integrated view gathering, the view gathering mechanism is distributed to the APs so that the views are collected sequentially by successive agreement parties as they are transferred to the AVP. If the view gathering and generation are integrated in this manner, a submission chain needs to be set up beforehand among all APs. After the first AP on this chain generates its view, the view is sent to the second AP in this chain. Upon receiving a view from the first AP, the second AP is triggered to generate its own view. Then both views are forwarded to the third AP in this chain, and so on. This process is executed in turn by each AP on this submission chain and finally all views are sent by the last AP on the submission chain to the AVP. In that case, the TID and NIT can be omitted also.

Figure 5:
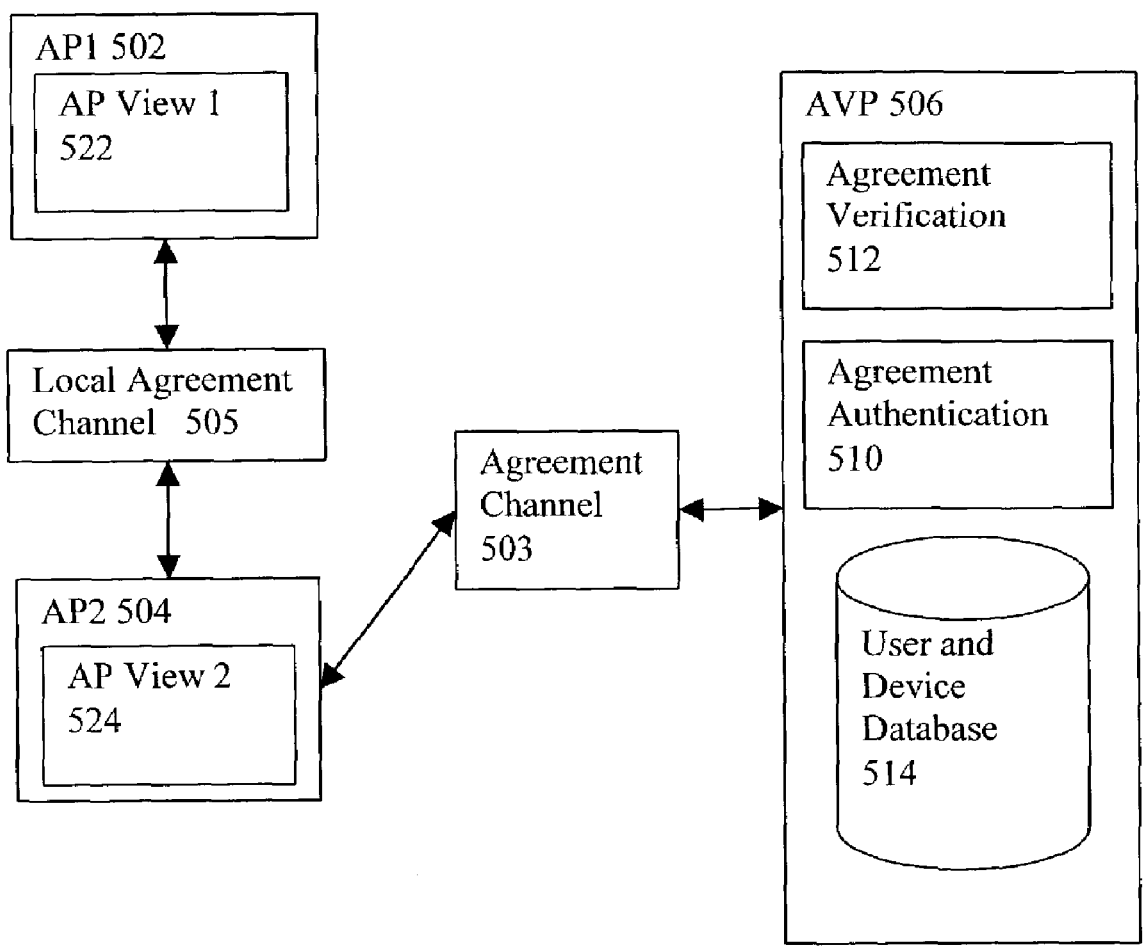
FIG. 5 illustrates how random bit padding is applied to encrypted data fields.

An example of such an integrated view gathering and generation system is shown in the computer system 500 of FIG. 5. As shown in FIG. 5, the first AP device 502 comprising a local Agreement Channel 505 generates its view 522 of the agreement. The view 522 is sent to the second AP device 504 via the local agreement channel 505. Upon receiving the view 522 from the first AP device 502, the second AP device generates its view 524 of the agreement. Then both views 522 524 of the agreement are sent to the AVP 506 via an agreement channel 503. In some implementations, the views may even be concatenated together and sent as one message. In this variation, because the views are gathered as they are generated, it is no longer necessary for the system 500 to include a View Gathering component. The AVP 506 itself comprises three components the Agreement Authentication Module 510, which is identical to the Agreement Authentication Module 118, the Agreement Verification Module 512 which is identical to the Agreement Verification Module 112, and the User and Device Database 514, which is identical to the User and Device Database 114.

Another variation of the invention permits the assembly of a multi-layered agreement view as a result of an integrated view gathering architecture. In this system, each successive AP may perform an operation on the agreement data received from APs earlier in the chain. The initial agreement data is included in the view of the first AP. The second AP uses the view received from the first AP as part of its own agreement data and produces its own view, based on a function of the received view. Finally, what the AVP receives is a single, multi-layered view. Combined with the physical separation of AVP modules, such as the MM and AVM and appropriate encryption/decryption algorithms, applications of this variation of the present invention can support new capabilities in supporting privacy. An example application of the present invention variation for electronic voting will be given later in this document.

Examples of Applications of the Present Invention

Figure 6:
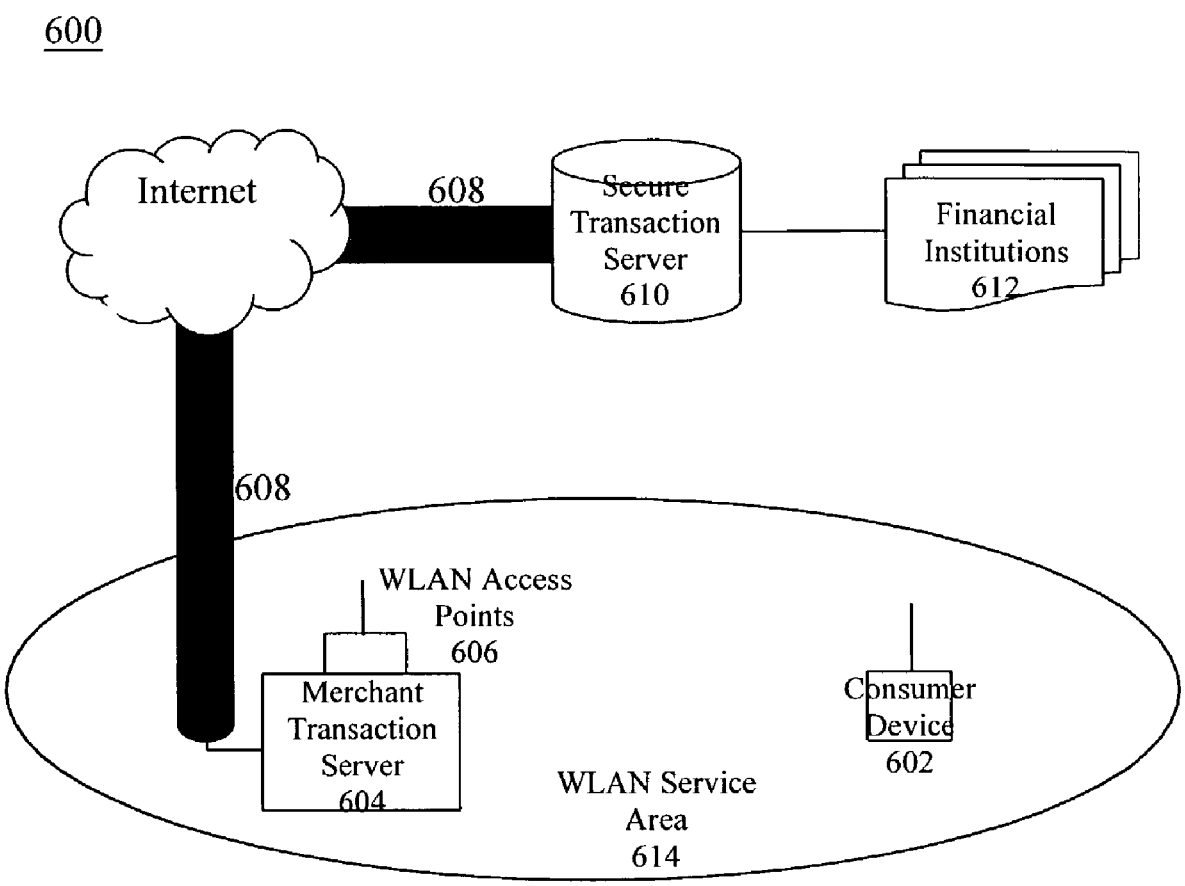
FIG. 6 shows an example application of the present invention in purchasing of goods and services.

The first application example of the present invention is shown in FIG. 6. It is a wireless payment system 600 for payments by consumers in physical retail stores. The architecture is similar to that shown in the chained integrated view gathering variation shown in FIG. 5. In this example, the backend server called Secure Transaction Sever (STS) 610 is the AVP. The STS 610 is further connected to a Transaction Processing Component that is a Financial Institution 612 to carry out the actual processing of the financial transactions. The APs are the consumers and the merchants and they have their own AP devices 602 and 604. For consumers, the AP device 602 can be any mobile device with wireless capability, such as Personal Digital Assistant, a mobile phone or a credit card sized mini-computing device which are capable of wireless communication and carrying out SAS computations. For merchants, the AP device can be a computer 604 comprising a wireless LAN access points 606 providing service to a WLAN service area 614 and a connection to the backend STS 610 via the Internet (called an Agreement Channel 608).

The agreement is the data requesting a monetary transaction between the consumer and the merchant for purchase of physical or virtual goods. After the consumer finalizes her purchase, her AP device 602 generates her view of the transaction. The view is sent to the merchant device 604 using a wireless LAN access service, which in turn triggers the merchant device 604 to generate the merchant's view. Then the merchant device sends both views together to the STS 610 over the Agreement Channel implemented as a secure Internet connection. After the STS 610 authenticates the identities of both the merchant and the consumer through decryption, it extracts the monetary transaction request data from the views and performs the basic verification procedures. If successful, the STS forwards the requests to a financial institute 612 for further transaction processing and eventual monetary exchange. Results from the financial institute 612 are returned to the STS 610 and encrypted as receipts to both the merchant and consumer. Both receipts are sent to the merchant device 604 over the Agreement Channel and the merchant device 604 forwards the consumer receipt to the consumer device 602 over the wireless LAN. In a variation, the purchase occurs in two stages, the first stage being a transaction during which the merchant and the consumer request a purchase and the second stage being a transaction during which the consumer and the merchant authorize the purchase, with the consumer also selecting which financial account to use for the transaction.

In this example, the wireless payment application uses an integrated view gathering approach due to the fact that the consumer AP device 602 does not have a direct communication link to the AVP 610 and the merchant device 604 concatenates its view after it receives a view from client device 602. At the AVP end, the authentication processing and verification processing are co-located on the STS 610. In addition to the components in the present invention, the application also has the additional Transaction Processing Component of a financial institution 612 to carry out additional application specific processing.

Figure 7:
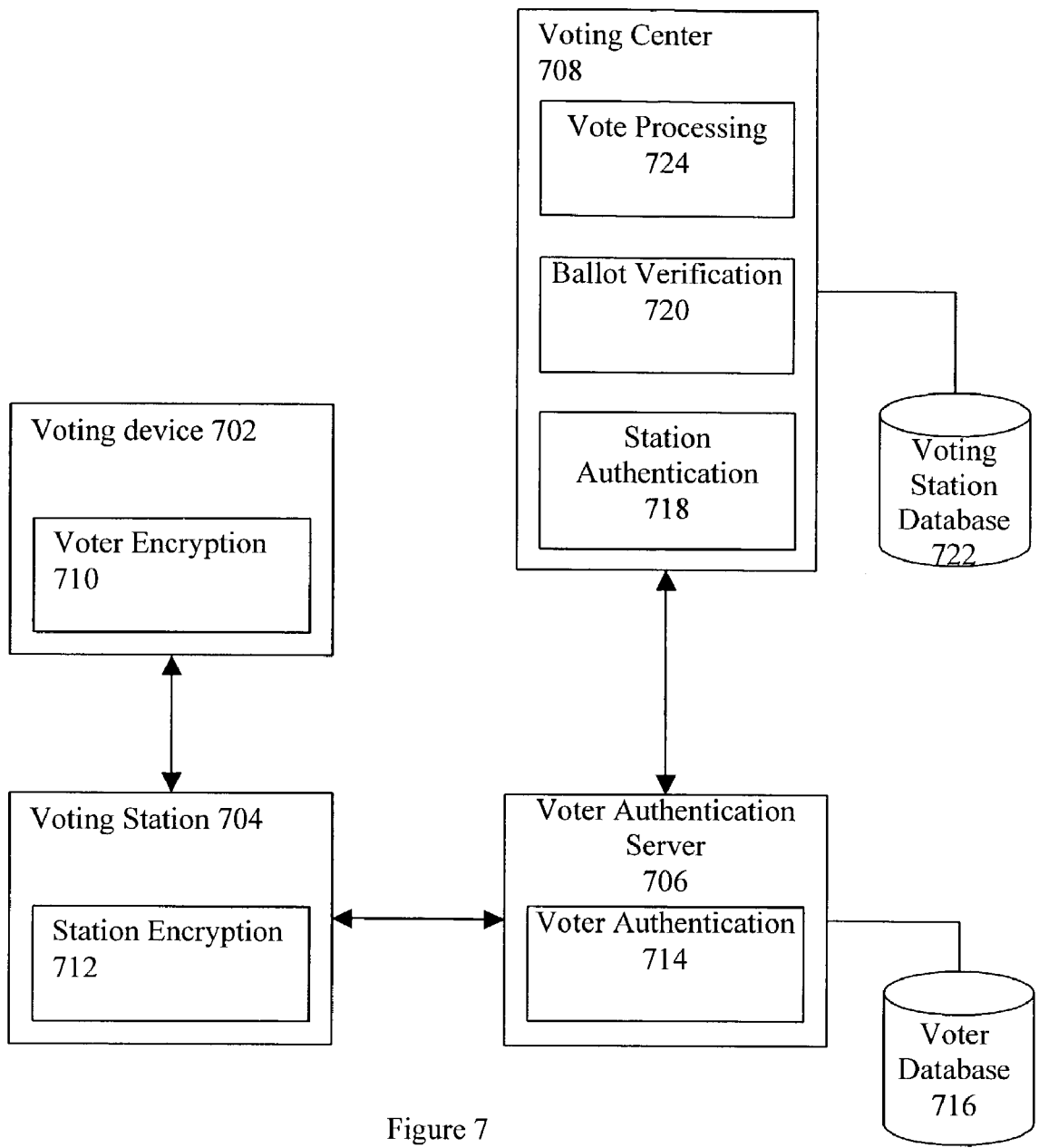
FIG. 7 shows a different example application of the present invention applied to electronic voting.

The second application example is shown in FIG. 7. It is an electronic voting system 700. The system is an application of the variation of the present invention with an integrated view gathering function and a multilayered agreement. The scheme allows wireless voting at official voting stations and provides the following properties: registered voter authentication, voting station authentication, voter anonymity, vote confidentiality, vote auditing, and ensuring one vote per voter. In this system, voters and voting stations are the APs. Their devices 702 and 704 are the AP devices. The Authentication Server 706 and the Voting Center 708 together implement the functions of the AVP and the Transaction Processing.

The agreement data, consisting of the ballot, is obtained from a voting station by a request from the voter. The voter receives the proper ballot on her device and then enters the vote information. The filled-in ballot is first encrypted by the voter encryption 710 function of the voter device 702 using the standard encryption technique of the SASE. The encrypted ballot data is then sent to the voting station 704. The voting station 704 uses its station encryption function 712 to double encrypt the ballot, using the key generated by the voting station. In this voting application, an additional requirement is that the actual encryption algorithm used to encrypt the ballot data needs to be "commutative". That is, it does not matter what order the decryptions are applied to a piece of multi-encrypted data, as long as the corresponding decryptions of all encryptions used to produce the multi-encrypted data are applied, the original plaintext can be revealed. Many modern symmetric stream ciphers do fall into this category and thus can be used by this system.

After the double encrypted ballot is sent to the Voter Authentication Server 706, with the help of information stored in the Voter Database 716, the Voter Authentication Server 706 uses the Voter Authentication function 714 to remove the encryption applied by the voter device 702. The resulting ballot, still encrypted with the voting station's key and therefore not readable by the Voter Authentication Server 706, is then forwarded to the Voting Center 708. The Voting Center 708, passes the encrypted ballot to the Station Authentication Server 718. The Station Authentication Server 718, with the help of the Voting Station Database 722, removes the encryption applied by the voting station to reveal the contents of the ballot. The ballot and some additional Information contained in the views are passed to the Ballot Verification server 720. This applies some specific matching rules to verify that the ballot is consistent. If the ballot is verified, then the plaintext ballot is passed to the Vote Processing function 724 for vote counting and other voting information collection.

By applying the variation of the present invention and commutative encryption algorithms, the voting system is able to authenticate voters (by the Voter Authentication Server 606) while still maintaining the anonymity of the ballots while collecting vote information (by the Voting Center 608) from legitimate voting stations. During the process, no single component (other than the voter device) is able to discover what a particular voter voted for or to which voter a fully decrypted vote belongs to.

Tokens

Another application of the SAS is to provide a method of securely distributing special messages called "tokens" that can be thought of as tickets. Such tokens are generated by the AVP as the result of an agreement and sent to one or more members of the agreement. They can be used by members of a previously authenticated agreement to authenticate the other members of the agreement directly without contacting the AVP at the time of authentication. A second use is to authenticate the presentation of the result of a previously authenticated agreement by a third party (who may or may not be a party to the original agreement) without directly contacting the AVP at the time of authentication. The tokens can be used as tickets where in the former case, the identity of the ticket holder and the ticket are important (as in airline tickets), and in the later case, the identity of the ticket holder is not important, just the validity of the ticket. The token should only be used once, as there is not strong security between the two parties.

Let AP1 and AP2 be two parties of an agreement that has been verified by the AVP. At some time in the future, AP2 would like the ability to verify the identity of AP1 without consulting the AVP again. The token is a type of AVP response message in which the agreement data portion of the response message contains special token identifying information.

Figure 8:
FIG. 8 illustrates how the present invention can be used to generate 3rd-party verifiable tokens.
Figure 8:
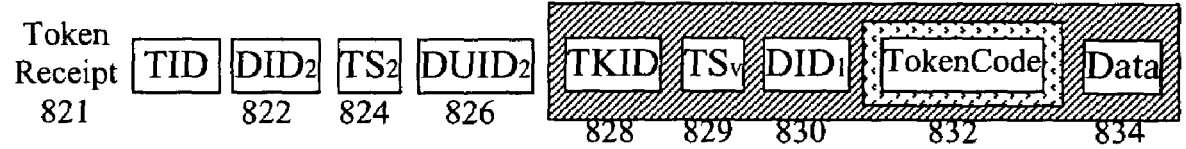

FIG. 8 illustrates a method 800 of using the present invention to generate 3rd-party verifiable tokens.

As shown in FIG. 8, tokens are generated by the AVP in pairs, with one called token 801 and the other called token receipt 821. The token 801 is sent to AP1, the party to be authenticated, while the token receipt 821 is sent to AP2, the party that wants the authentication service.

The formats of the token and token receipt are shown in FIG. 8. Both are formatted in the same fashion as other AVP response messages. The plaintext part of both token and token receipt contains the same fields as other AVP response messages as described before. Specifically, the plaintext part of token 801 includes DID1 802, TS1 804, DUID1 806 and the plaintext part of token receipt 821 includes DID2 822, TS2 824 and DUID2 826. The cipher text part of a token 801 contains a token identifier TKID 808 that is used to uniquely identify a token pair, the DID 810 of AP2, a token code 812, and other data 814 associated with the token. The cipher text part of a token 801 is encrypted by the AVP using a key generated using standard SASE for the current user of AP1. A token receipt 821 is formatted almost the same as a token except for two differences. The first difference is that the token code 832 included in the token receipt 821 is firstly encrypted using SASE with AP1's parameters except for the timestamp. The timestamp could be any future time value TSv chosen by the AVP. Such a TSv 829 is also included in the cipher text part of the token receipt 821, which is the second difference between a token and a token receipt.

Upon receiving a token, AP1, the party whose identity is to be verified, will decrypt the token and store the TKID 808, DID2 810, Token Code 812, and token data 814 for future use. AP2, the verifying party, stores the TKID 828, TSv 829, DID1 830, token code 832, and token data 834. The token code 832 stored by AP2 is still encrypted by SASE using the parameters for AP1 and TSv. On the other hand, the token code 812 stored by AP1 is in plaintext form.

At the time of token verification, AP2 requests that AP1 deliver the token to AP2 by sending a Token Request message containing the TKID 828 and the TSv 829 of the token. AP1 receives the request, encrypts the token code 812 with its own SASE parameters and TSv as timestamp value. Then AP1 transmits the encrypted token code to AP2. At AP2, if the received encrypted token code is found to be the same bit by bit as the locally stored token code 832, the token is verified and thus the user is authenticated as being a member of the agreement.

For the second case, where the identity of the token holder is not important, the original token holder can pass the encrypted token to a third party. Let AP1 be the original token holder and AP2 be the verifier. The third party, P, must store the encrypted token and the necessary parameters, such as TKID, TSv, DID2. P presents the token to AP2, by sending an unencrypted message to AP2 containing the TKID, TSv and the token (encrypted by AP1).

The tokens are useful to verify that a party has a valid result of an agreement. For example, a party has used a mobile computing device to wirelessly purchase movie tickets and has wireless transmitted one ticket to a companion. When the tickets were purchased, a user receives on her device an encrypted token for each ticket and some additional data such as total number of tickets, time, place, etc.

The movie theater also receives the token information. At entry time, each user wirelessly presents one or more tokens and is granted entry.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A computer system securely transmitting and verifying a two-party agreement, said system comprising:
    a first device, operated by the first party, developing and transmitting a first view of the two-party agreement based upon first device respective non-transmitted and transmitted transaction time dependent and device dependent parameters, the first view including an encrypted part based upon the first device non-transmitted time dependent and device dependent parameters and an unencrypted plaintext part including the first device transmitted transaction time dependent and device dependent parameters,
    wherein the first device encrypts the encrypted part of the first view using a first device encryption key according to a deterministic algorithm based on a non-stored Private Identification Entry (PIE) input to the first device and a deterministic algorithm based on the first device non-transmitted transaction time dependent and device dependent parameters:
    a second device, operated by the second party, developing and transmitting a second view of the two-party agreement, the second view including an encrypted part encrypted by a second device encryption key and an unencrypted plaintext part including second device transmitted transaction time dependent and device dependent parameters: and
    a third device comprising a verification party
        receiving the first view and the second view,
        generating the first device encryption key based upon the first device transmitted transaction time dependent and device dependent parameters and information known by the third device about the first device PIE and the first device non-transmitted time dependent and device dependent parameters,
        generating the second device encryption key based upon the second device transmitted transaction time dependent and device dependent parameters,
        decrypting the encrypted part of the first and second views, based upon the respective first and second device encryption keys,
        comparing the first view with the second view, and transmitting a signal based on the comparing,
    wherein the first device PIE and the first and second device encryption keys are not communicated among the first, second and third devices.

2. The computer system as in 1, wherein either the first device transmits the first view to the third device and the second device independently transmits the second view to the third device, or the first device transmits the first view to the second device and the second device concatenates the first view and the second view and transmits the concatenated view to the third device.

3. The computer system as in claim 2, wherein the third device transmits a response to the first device and the second device either if the third device determines that the decrypted part of the first view matches the decrypted part of the second view for the agreement or if the third device determines that the decrypted part of the first view does not match the decrypted part of the second view for the agreement.

4. The computer system as in claim 3, wherein the plaintext part of the view of the first device includes a device identification of the first device and a transaction timestamp at the first device as the first device transmitted transaction time dependent and device dependent parameters, and the encrypted part includes data corresponding to an agreement and a device identification of the second device as the second device transmitted device dependent parameter.

5. The computer system as in claim 4, wherein the plaintext portion optionally includes a transaction ID and the encrypted portion optionally includes one or more of the transaction ID, a message digest, the transaction timestamp, a user ID of a user of the first device and padding data.

6. The computer system as in claim 3, wherein the response from the third device to the first device comprises a plaintext part and an encrypted part, wherein the plaintext part of the response includes the first device transmitted device dependent parameter and a third device transaction timestamp and optionally includes a transaction ID, and the encrypted part includes data corresponding to a response to the agreement and optionally includes one or more of the first device transmitted device dependent parameter, the second device transmitted device dependent parameter, the transaction ID, a message digest, the transaction timestamp, a user ID of a user of the first device and padding data.

7. The computer system of claim 6, in which the encrypted part of the response of the third device to the first device is encrypted using a third device encryption key and a cryptographic algorithm in which the third device encryption key is not communicated either between the first device and the second device or the first device and the third device.

8. The computer system of claim 7 in which the third device encryption key used by the third device to encrypt the encrypted portion of the response to the first device is generated according to a deterministic algorithm based on the first device PIE and the third device non-transmitted transaction time dependent parameter.

9. The computer system of claim 8 in which each of the third device and the first device comprises a known pseudo-random number generator, a known hash function and a known transformation function and deterministically produce the first device encryption key by:
    the pseudo-random number generator receives as input a seed and a base timestamp, as the information known by the first device and the third device about the first device non-transmitted time dependent and device dependent parameters and receiving as input the transmitted first device transaction timestamp and device dependent parameters, and producing as output a random number;
    the transformation function taking as input said random number and the information known by the third device about the first device PIE or the non-stored PIE input to the first device and producing as output a number; and the hash function taking as input said number and produces as output the first device encryption key.

10. The computer system as in claim 3, wherein the plaintext part of the view of the second device includes a device identification of the second device and a transaction timestamp at the second device as the second device transmitted transaction time dependent and device dependent parameters, and the encrypted part includes data corresponding to an agreement, and a device identification of the first device as the first device transmitted device dependent parameter of the first device.

11. The computer system as in claim 10, wherein the plaintext portion optionally includes a transaction ID and the encrypted portion optionally includes one or more of the transaction ID, a message digest, the transaction timestamp, a user ID of a user of the second device and padding data.

12. The computer system as in claim 3, wherein the response from the third device to the second device comprises a plaintext part and an encrypted part, wherein the plaintext part of the response includes the second device transmitted device dependent parameter and a third device transaction timestamp and optionally includes a transaction ID, and the encrypted part includes data corresponding to a response to the agreement and optionally includes one or more of the second device transmitted device dependent parameter, the first device transmitted device dependent parameter, the transaction ID, a message digest, the transaction timestamp, a user ID of a user of the second device and padding data.

13. The computer system of claim 12, in which the encrypted part of the response of the third device to the second device is encrypted using a third device encryption key and a cryptographic algorithm in which the third device encryption key is not communicated either between the first device and the second device or the second device and the third device.

14. The computer system of claim 13 in which the third device encryption key used by the third device to encrypt the encrypted part of the response is generated according to a deterministic algorithm based on the second device PIE and the third device non-transmitted transaction time dependent parameter.

15. The computer system of claim 14 in which each of the third device and the second device comprises a known pseudo-random number generator, a known hash function and a known transformation function and deterministically produce the second device encryption key by:
the pseudo-random number generator receiving as input a seed and a base timestamp, as information known by the second device and the third device about the second device non-transmitted time dependent and device dependent parameters and receiving as input the transmitted second device transaction timestamp and device dependent parameters and producing as output a random number;
the transformation function taking as input said random number and information known by the third device about the second device PIE or the non-stored second device PIE and producing as output a number; and
the hash function taking as input said number and producing as output the second device encryption key.

16. The computer system of claim 1 in which each of the first device and the third device comprises a known pseudo-random number generator, a known hash function and a known transformation function to deterministically produce, by the first device, the first device encryption key and to deterministically produce, by the third device, the first device encryption key by:
the pseudo-random number generator receiving as input a seed and a base timestamp, as the information known by the first device and the third device about the first device non-transmitted time dependent and device dependent parameters and receiving as input the transmitted first device transaction timestamp and device dependent parameters, and producing as output a random number;
the transformation function taking as input said random number and the information known by the third device about the first device PIE or the non-stored PIE input to the first device and producing as output a number; and
the hash function taking as input said number and producing as output the first device encryption key.

17. The computer system of claim 1 in which the second encryption key used by the second device to encrypt the view is generated according to a deterministic algorithm based on a non-stored Private Identification Entry (PIE) input to the second device and second device non-transmitted transaction time dependent and device dependent parameters, wherein the second device PIE is known only to the user of the second device and is not stored on the second device and is also known to the third device that receives the encrypted view developed by the second device.

18. The computer system of claim 17 in which each of the second device and the third device comprises a known pseudo-random number generator, a known hash function and a known transformation function and deterministically produce the second device encryption key by:
the pseudo-random number generator receiving as input a seed and a base timestamp, as information known by the second device and the third device about the second device non-transmitted time dependent and device dependent parameters and receiving as input the transmitted second device transaction timestamp and device dependent parameters and producing as output a random number;
the transformation function taking as input said random number and information known by the third device about the second device PIE or the non-stored second device PIE and producing as output a number; and
the hash function taking as input said number and producing as output the second device encryption key.

19. A computer system securely transmitting and verifying a multi-party agreement among N parties where N is larger than or equal to two, said computer system comprising:
a collection of N devices, each device operated by a party to the agreement, developing and transmitting its view of the multi-party agreement based upon non-transmitted and transmitted transaction time dependent and device dependent parameters, each view including an encrypted part based upon the device non-transmitted time dependent and device dependent parameters and an unencrypted plaintext part including the device transmitted transaction time dependent and device dependent parameters,
wherein each device encrypts the encrypted part of its view using a device encryption key according to a deterministic algorithm based on a respective non-stored Private Identification Entry (PIE) input to each device and the device non-transmitted transaction time dependent and device dependent parameters: and an N+1-st device comprising a verification party receiving the views from the N agreement parties,
  generating the device encryption keys of the N agreement parties based upon the device transmitted transaction time dependent and device dependent parameters and information known by the N+1-st device about the PIE and the device non-transmitted time dependent and device dependent parameters,
  decrypting the encrypted part of each view based upon the device encryption keys,
  comparing the views from the N agreement parties, and transmitting a response signal based on the comparing,
  wherein the PIE and the device encryption keys are not communicated among the N agreement.

20. The computer system as in 19, wherein either each of the N devices independently transmits its view to the N+1-st device comprising the verification party, or, each of the N devices concatenates its view to a list of views until all N views are collected so that each view appears once in the list and the list is then transmitted to the N+1-st device.

21. The computer system as in claim 20, wherein the N+1-st device transmits a response to each of the N devices in the multi-party agreement either if it decides that the decrypted part of all N views from the N devices in the multi-party agreement match each other for the purposes of the agreement or if it decides that the decrypted part of all N views from the N devices in the multi-party agreement do not match each other for the purposes of the agreement.

22. The computer system as in claim 21, wherein the plaintext part of the view of a device includes a device identification and a transaction timestamp at each device as the device transmitted transaction time dependent and device dependent parameters, and the encrypted part includes data corresponding to a multi-party agreement and a device identification for each of other devices in the multi-party agreement as the device transmitted device dependent parameter of the other devices.

23. The computer system as in claim 22, wherein the plaintext portion of a view from a device optionally includes a transaction ID, a number of parties in the agreement and the encrypted portion optionally includes one or more of the transaction ID, the number of parties in the agreement, a message digest, the transaction timestamp, a user ID of a user of the device and padding data.

24. The computer system as in claim 20, wherein the response from the N+1-st device to a device in the multi-party agreement comprises of a plaintext part and an encrypted part, wherein the plaintext part of the response includes the device identification of the device as the device transmitted device dependent parameter and a N+1-st device transaction timestamp and optionally includes a transaction ID, and the encrypted part includes data corresponding to a response to the agreement and optionally includes one or more of a device identification of the and/or device identification of the other devices of the parties in the agreement as the device transmitted device dependent parameters, the transaction ID, the number of parties in the agreement, a message digest, the transaction timestamp, the user ID of the user of the device and padding data.

25. The computer system of claim 24, in which the encrypted part of the response of the N+1-st device to a device in the multi-party agreement is encrypted using a N+1-st device encryption key and a cryptographic algorithm in which the N+1-st device encryption key is not communicated among the devices and the N+1-st device.

26. The computer system of claim 25 in which the encryption key used by the N+1-st device to encrypt the response to a device in the multi-party agreement is generated according to a deterministic algorithm based on the PIE and the device non-transmitted transaction time dependent parameter.

27. The computer system of claim 26 in which a device in the multi-party agreement and the N+1-st device comprises a known pseudo-random number generator, a known hash function and a known transformation function and deterministically produce the identical of the N+1-st device encryption keys by:
  the pseudo-random number generator receiving as input a seed and a base timestamp, as the information known by each device and the N+1-st device about the device non-transmitted time dependent and device dependent parameters and receiving as input the transmitted device transaction timestamp and device dependent parameters, and producing as output a random number;
  the transformation function taking as input said random number and the information known by the N+1-st device about the PIE or the non-stored PIE input to the device and producing as output a number; and
  the hash function taking as input said number and producing as output the N+1-st device encryption key.

28. The computer system of claim 19, in which a device in the multi-party agreement and the N+1-st device comprises a known pseudo-random number generator, a known hash function and a known transformation function and deterministically produce the identical of the device encryption keys by:
  the pseudo-random number generator receiving as input a seed and a base timestamp, as the information known by each device and the N+1-st device about the device non-transmitted time dependent and device dependent parameters and receiving as input the transmitted device transaction timestamp and device dependent parameters, and producing as output a random number;
  the transformation function taking as input said random number and the information known by the N+1-st device about the PIE or the non-stored PIE input to the device and producing as output a number; and
  the hash function taking as input said number and producing as output the device encryption key.

29. A method of securely transmitting and verifying a two-party agreement in a computer system, said method comprising:
  developing and transmitting, by a first device operated by a first party, a first view of the two-part agreement based upon first device respective non-transmitted and transmitted transaction time dependent and device dependent parameters, the first view including an encrypted part based upon the first device non-transmitted time dependent and device dependent parameters and an unencrypted plaintext part including the first device transmitted transaction time dependent and device dependent parameters,
  wherein the encrypted part is encrypted using a first device encryption key according to a deterministic algorithm based on a non-stored Private Identification Entry (PIE) input to the first device and the first device non-transmitted transaction time dependent and device dependent parameters:
  developing and transmitting, by a second device operated by a second party, a second view of the two-party agreement, the second view including an encrypted part encrypted by a second device encryption key and an unencrypted plaintext part including second device transmitted transaction time dependent and device dependent parameters; and receiving, by a third device comprising a verification party, the first view and the second view, generating the first device encryption key based upon the first device transmitted transaction time dependent and device dependent parameters and information known by the third device about the PIE and the first device non-transmitted time dependent and device dependent parameters, generating the second device encryption key based upon the second device transmitted transaction time dependent and device dependent parameters, decrypting the encrypted part of the first and second views, based upon the respective first and second device encryption keys, comparing the first view with the second view transmitting a signal based on the comparing, wherein the PIE and the first and second device encryption keys are not communicated among the first, second and third devices.

30. A method securely transmitting and verifying a multi-party agreement among N parties where N is larger than or equal to two, in a computer system, said method comprising:

developing and transmitting, by a collection of N devices each device operated by a party to the agreement, its view of the multi-party agreement based upon non-transmitted and transmitted transaction time dependent and device dependent parameters, each view including an encrypted part based upon the device non-transmitted time dependent and device dependent parameters and an unencrypted plaintext part including the device transmitted transaction time dependent and device dependent parameters, wherein the encrypted part is encrypted using a device encryption key according to a deterministic algorithm based upon a respective non-stored Private Identification Entry (PIE) input to each device and the device non-transmitted transaction time dependent and device dependent parameters: and receiving, by an N+1-st device comprising a verification party, the views from the N agreement parties, generating the respective device encryption keys of the N agreement parties based upon the device transmitted transaction time dependent and device dependent parameters and information known by the N+1-st device about the PIE and the device non-transmitted time dependent and device dependent parameters, decrypting the encrypted part of each view based upon the device encryption keys, comparing the views from the N agreement parties and transmitting a response signal based on the comparing, wherein the PIE and the device encryption keys are not communicated among the N agreement parties.

31. A computer readable storage controlling a computer to securely transmit and verify a two-party agreement, by the functions comprising:

developing and transmitting, by a first device operated by the first party, a first view of the two-party agreement based upon first device respective non-transmitted and transmitted transaction time dependent and device dependent parameters, the first view including an encrypted part based upon the first device non-transmitted time dependent and device dependent parameters and an unencrypted plaintext part including the first device transmitted transaction time dependent and device dependent parameters, wherein the encrypted part is encrypted using a first device encryption key according to a deterministic algorithm based on a non-stored Private Identification Entry (PIE) input to the first device and the first device non-transmitted transaction time dependent and device dependent parameters;

developing and transmitting, by a second device operated by the second party, a second view of the two-party agreement, the second view including an encrypted part encrypted by a second device encryption key and an unencrypted plaintext part including second device transmitted transaction time dependent and device dependent parameters; and receiving, by a third device comprising a verification party, the first view and the second view, generating the first device encryption key based upon the first device transmitted transaction time dependent and device dependent parameters and information known by the third device about the PIE and the first device non-transmitted time dependent and device dependent parameters, generating the second device encryption key based upon the second device transmitted transaction time dependent and device dependent parameters, decrypting the encrypted part of the first and second views, based upon the respective first and second device encryption keys, comparing the first view with the second view and transmitting a signal based on the comparing, wherein the PIE and the first and second device encryption keys are not communicated among the first, second and third devices.

32. A computer readable storage controlling a computer to securely transmit and verify a multi-party agreement among N parties where N is larger than or equal to two, by the functions comprising:

developing and transmitting, by a collection of N devices each device operated by a party to the agreement, its view of the multi-party agreement based upon non-transmitted and transmitted transaction time dependent and device dependent parameters, each view including an encrypted part based upon the device non-transmitted time dependent and device dependent parameters and an unencrypted plaintext part including the device transmitted transaction time dependent and device dependent parameters, wherein the encrypted part is encrypted using a first device encryption key according to a deterministic algorithm based on a respective non-stored Private Identification Entry (PIE) input to each device and the first device non-transmitted transaction time dependent and device dependent parameters: and receiving, by an N+1-st device comprising a verification party, the views from the N agreement parties, generating the respective device encryption keys of the N agreement parties based upon the transmitted device transaction time dependent and device dependent parameters and information known by the N+1-st device about the PIE and the device non-transmitted time dependent and device dependent parameters, decrypting the encrypted part of each view based upon the device encryption keys, comparing the views from the N agreement parties and transmitting a response signal based on the comparing, wherein the PIE and the device encryption keys are not communicated among the N agreement parties.

* * * * *

UNITED STATES PATENT AND TRADEMARK OFFICE
CERTIFICATE OF CORRECTION

PATENT NO. : 7,353,382 B2
APPLICATION NO. : 10/458205
DATED : April 1, 2008
INVENTOR(S) : Yannis Labrou et al.

It is certified that error appears in the above-identified patent and that said Letters Patent is hereby corrected as shown below:

On the Title Page, Item (57) (Abstract), Line 9, change "partys" to --parties--.

Column 21, Line 37, after "device and" delete "a deterministic algorithm based on".

Column 21, Line 39, change "parameters:" to --parameters;--.

Column 21, Line 46, change "parameters:" to --parameters;--.

Column 21, Line 66, change "1" to --claim 1--.

Column 23, Line 11, after "parameter" delete "of the first device".

Column 24, Line 67, change "parameters:" to --parameters;--.

Column 25, Line 14, after "agreement" insert --parties--.

Column 25, Line 15, change "19" to --claim 19--.

Column 25, Line 54, before "and/or" delete "the".

Column 26, Line 47, change "two-part" to --two-party--.

Column 26, Line 61, change "parameters:" to --parameters;--.

Column 27, Line 17, after "view" insert --, and--.

Column 27, Line 22, after "method" insert --of--.

Column 27, Line 40, change "parameters:" to --parameters;--.

Column 28, Line 27, after "view" insert --,--.

UNITED STATES PATENT AND TRADEMARK OFFICE
CERTIFICATE OF CORRECTION

PATENT NO. : 7,353,382 B2
APPLICATION NO. : 10/458205
DATED : April 1, 2008
INVENTOR(S) : Yannis Labrou et al.

It is certified that error appears in the above-identified patent and that said Letters Patent is hereby corrected as shown below:

Column 28, Line 51, change "parameters:" to --parameters;--.

Signed and Sealed this

Eighteenth Day of November, 2008

JON W. DUDAS
*Director of the United States Patent and Trademark Office*